US012630771B2

(12) United States Patent
Sun et al.

(10) Patent No.: US 12,630,771 B2
(45) Date of Patent: May 19, 2026

(54) ONE-STEP FIXED-BED CATALYTIC PROCESS FOR UPGRADING PYROLYSIS OIL TO LIGHTER AROMATIC COMPOUNDS

(71) Applicant: Saudi Arabian Oil Company, Dhahran (SA)

(72) Inventors: Miao Sun, Dhahran (SA); Noor Al-Mana, Al Khobar (SA); Lianhui Ding, Dhahran (SA); Eman Zaki Albaher, Qatif (SA); Guanghui Zhu, Dhahran (SA); Ke Zhang, Winchester, MA (US)

(73) Assignee: Saudi Arabian Oil Company, Dhahran (SA)

( * ) Notice: Subject to any disclaimer, the term of this patent is extended or adjusted under 35 U.S.C. 154(b) by 264 days.

(21) Appl. No.: 18/355,794

(22) Filed: Jul. 20, 2023

(65) Prior Publication Data

US 2025/0026991 A1     Jan. 23, 2025

(51) Int. Cl.
    *C10G 47/12*      (2006.01)
    *B01J 21/04*      (2006.01)
             (Continued)

(52) U.S. Cl.
    CPC .............. *C10G 47/12* (2013.01); *B01J 21/04* (2013.01); *B01J 21/066* (2013.01); *B01J 23/002* (2013.01);
             (Continued)

(58) Field of Classification Search
    CPC ........ C10G 69/04; C10G 11/14; C10G 45/68; C10G 47/20; C10G 2300/70;
             (Continued)

(56) References Cited

U.S. PATENT DOCUMENTS 3,099,617 A    7/1963   Tulleners
4,550,090 A   10/1985  Degnan et al.
             (Continued)

FOREIGN PATENT DOCUMENTS

CN     104355995 A    2/2015
CN     106622354 A    5/2017
             (Continued)

OTHER PUBLICATIONS

Guerzoni et al. "Catalytic Cracking of a Hydrocarbon Mixture on Combinations of HY and HZSM-5 Zeolites" Chemistry Department, Journal of Catalysis 139, 289-303 (1993), 15 pgs.
             (Continued)

*Primary Examiner* — Randy Boyer
*Assistant Examiner* — Juan C Valencia
(74) *Attorney, Agent, or Firm* — Dinsmore & Shohl LLP

(57) ABSTRACT

Systems and method for upgrading pyrolysis oil to produce greater value aromatic compounds includes combining heavy pyrolysis oil and a diluent to produce the pyrolysis oil feed with least 30 wt. % multi-ring aromatic compounds boiling at greater than 360° C. The systems and methods include passing the pyrolysis oil feed to a fixed bed reactor having a hydrocracking catalyst that includes pellets having a particle size greater than or equal to 0.1 millimeter. The hydrocracking catalyst is a mixed metal oxide catalyst that includes a binder and mixed metal oxide particles or a supported metal oxide catalyst that includes molybdenum oxide and nickel oxide supported on a catalyst support material comprising a large-pore alumina. The methods may further include contacting the pyrolysis oil feed with the hydrogen in the presence of the hydrocracking catalyst at reaction conditions in the fixed bed reactor to produce a reaction effluent.

20 Claims, 4 Drawing Sheets

(51) Int. Cl.

| | |
|---|---|
| *B01J 21/06* | (2006.01) |
| *B01J 23/00* | (2006.01) |
| *B01J 23/745* | (2006.01) |
| *B01J 23/83* | (2006.01) |
| *B01J 23/883* | (2006.01) |
| *B01J 35/40* | (2024.01) |
| *B01J 35/50* | (2024.01) |
| *B01J 35/61* | (2024.01) |
| *B01J 35/63* | (2024.01) |
| *B01J 35/64* | (2024.01) |
| *B01J 37/00* | (2006.01) |
| *B01J 37/28* | (2006.01) |
| *C10G 47/04* | (2006.01) |
| *C10G 69/06* | (2006.01) |

(52) U.S. Cl.

CPC ............. *B01J 23/745* (2013.01); *B01J 23/83* (2013.01); *B01J 23/883* (2013.01); *B01J 35/40* (2024.01); *B01J 35/50* (2024.01); *B01J 35/612* (2024.01); *B01J 35/613* (2024.01); *B01J 35/633* (2024.01); *B01J 35/647* (2024.01); *B01J 37/0009* (2013.01); *B01J 37/28* (2013.01); *C10G 47/04* (2013.01); *C10G 69/06* (2013.01); *C10G 2300/1096* (2013.01); *C10G 2300/4006* (2013.01); *C10G 2300/4012* (2013.01); *C10G 2300/4018* (2013.01); *C10G 2300/70* (2013.01); *C10G 2300/802* (2013.01); *C10G 2400/30* (2013.01)

(58) Field of Classification Search

CPC .... C10G 2400/30; C10G 49/02; C10G 69/06; C10G 65/12; C10G 47/12; C10G 47/04; C10G 2300/1096; C10G 2300/4006; C10G 2300/4012; C10G 2300/4018; C10G 2300/802; B01J 21/04; B01J 23/83; B01J 29/045; B01J 21/066; B01J 23/002; B01J 23/745; B01J 23/883; B01J 35/40; B01J 35/50; B01J 35/612; B01J 35/613; B01J 35/633; B01J 35/647; B01J 37/0009; B01J 37/28

See application file for complete search history.

(56) References Cited

U.S. PATENT DOCUMENTS

| | | | |
|---|---|---|---|
| 4,602,000 | A | 7/1986 | Dupin et al. |
| 6,531,051 | B1 | 3/2003 | Kasztelan et al. |
| 7,232,515 | B1 | 6/2007 | Demmin et al. |
| 9,217,114 | B2 | 12/2015 | Cortright et al. |
| 9,321,973 | B2 | 4/2016 | Marchand et al. |
| 10,118,163 | B1 | 11/2018 | Zhang |
| 10,751,709 | B1 | 8/2020 | Sun et al. |
| 10,751,710 | B1 | 8/2020 | Sun |
| 10,835,894 | B1 | 11/2020 | Sun et al. |
| 10,870,106 | B1 | 12/2020 | Sun |
| 10,953,396 | B2 | 3/2021 | Sun et al. |
| 11,027,271 | B2 | 6/2021 | Sun |
| 11,123,725 | B2 | 9/2021 | Sun et al. |
| 11,130,119 | B2 | 9/2021 | Sun |
| 11,377,400 | B1 | 7/2022 | Sun et al. |
| 11,384,297 | B1 * | 7/2022 | Sun ......................... B01J 23/002 |
| 2005/0070423 | A1 | 3/2005 | Kishan et al. |
| 2009/0171123 | A1 | 7/2009 | Glaser et al. |
| 2009/0173666 | A1 | 7/2009 | Zhou et al. |
| 2009/0321315 | A1 | 12/2009 | Bhattacharyya et al. |
| 2010/0314295 | A1 | 12/2010 | Sandstede et al. |
| 2012/0094879 | A1 | 4/2012 | Roberts et al. |
| 2012/0238792 | A1 | 9/2012 | Watson et al. |
| 2013/0143972 | A1 | 6/2013 | Townsend et al. |
| 2013/0164205 | A1 | 6/2013 | Putluru et al. |
| 2013/0178664 | A1 | 7/2013 | Zhou et al. |
| 2013/0245338 | A1 | 9/2013 | Weiner et al. |
| 2014/0021096 | A1 | 1/2014 | Chaumonnot et al. |
| 2014/0130402 | A1 | 5/2014 | Kastner et al. |
| 2015/0231615 | A1 | 8/2015 | Bondulle et al. |
| 2015/0274620 | A1 | 10/2015 | Zong et al. |
| 2017/0001180 | A1 | 1/2017 | Ravishankar et al. |
| 2018/0142159 | A1 | 5/2018 | Kumar et al. |
| 2018/0290131 | A1 | 10/2018 | Carrette |
| 2018/0333708 | A1 | 11/2018 | Ding et al. |
| 2018/0334622 | A1 * | 11/2018 | Agrawal .................. C10G 9/36 |
| 2019/0134616 | A1 | 5/2019 | Jae et al. |
| 2019/0173666 | A1 | 6/2019 | Ardashev et al. |
| 2021/0001318 | A1 | 1/2021 | Sun et al. |
| 2021/0130715 | A1 | 5/2021 | Xu et al. |

FOREIGN PATENT DOCUMENTS

| | | |
|---|---|---|
| FR | 3075663 A1 | 6/2019 |
| WO | 0042127 A1 | 7/2000 |
| WO | 2012085358 A1 | 6/2012 |
| WO | 2013176277 A1 | 11/2013 |
| WO | 2017207976 A1 | 12/2017 |
| WO | 2018011642 A1 | 1/2018 |
| WO | 2019197987 A1 | 10/2019 |

OTHER PUBLICATIONS

Hanif et al. "Supported solid and heteropoly acid catalysts for production of biodiesel" Catalysis Reviews (2017) vol. 59, No. 2, 165-188, 24 pgs.

Jimenez-Cruz et al. "Molecular size evaluation of linear and branched paraffins from the gasoline pool by DFT quantum chemical calculations" Science Direct, Fuel 83 (2004) 2183-2188, 7 pgs.

Kim et al. "Novel Ni2P/zeolite catalysts for naphthalene hydrocracking to BTX" Catalysis Communications 45 (2014) 133-138, 6 pgs.

Kim et al. "Morphology effect of b-zeolite supports for Ni2P catalysts on the hydrocracking of polycyclic aromatic hydrocarbons to benzene, toluene, and xylene" Journal of Catalysis 351 (2017) 67-78, 12 pgs.

Kondoh et al., "Catalytic cracking of heavy oil over TiO2—ZrO2 catalysts under superheated steam conditions", Fuel, vol. 167, pp. 268-294, 2016.

Kondoh et al., "Effects of H2O Addition on Oil Sand Bitumen Cracking Using a CeO2—ZrO2—Al2O3—FeOx Catalyst", Energy Fuels, vol. 30, pp. 10358-10364, 2016.

Kondoh et al., "Upgrading of oil sand bitumen over an iron oxide catalyst using sub- and super-critical water", Fuel Processing Technology, vol. 145, pp. 96-101, 2016.

Kumar et al., "MCM-41, MCM-48 and related mesoporous adsorbents: their synthesis and characterization", Colloids and Surfaces A: Physicochemical and Engineering Aspects 187-188 (2001), pp. 109-116.

Lapinas et al. "Catalytic Hydrogenation and Hydrocracking of Fluorene: Reaction Pathways, Kinetics, and Mechanisms" Ind. Eng. Chem. Res. 1991, 30, 42-50, 9 pgs.

Leite et al. "Hydrocracking of phenanthrene over bifunctional Pt catalysts" Catalysis Today 65 (2001) 241-247, 7 pgs.

Lemberton et al. "Catalytic hydroconversion of simulated coal tars" Applied Catalysis A: General, 79 (1991) 115-126, 12 pgs.

Martinez-Franco et al., "Hiigh-silica nanocrystalline Beta zeolites: efficient synthesis and catalytic application", Chem. Sci., 2016, 7, pp. 102-108.

Matsui et al. "Explanation of Product Distribution of Hydrocracking Reaction of Aromatic Hydrocarbons with Nickel-Loaded Zeolites Based on CAMD Study on Interaction between Zeolites and Substrates" Energy & Fuels (1995) 9, 435-438, 4 pgs.

Nikulshin et al. "CoMo/Al2O3 catalysts prepared on the basis of Co2Mo10-heteropolyacid and cobalt citrate: Effect of Co/Mo ratio", Fuel, vol. 100, Oct. 2012, pp. 24-33.

Okuhara et al. "Catalytic Chemistry of Heteropoly Compounds" Advances in Catalysis, Adv Cata vol. 41 (1996) 113, 140 pgs.

(56)　　　　　　References Cited

OTHER PUBLICATIONS

Park et al. "Hydro-conversion of 1-methyl naphthalene into (alkyl)benzenes over alumina-coated USY zeolite-supported NiMOS catalysts" Fuel 90 (2011) 182-189, 8 pgs.

Park et al. "Mild hydrocracking of 1-methyl naphthalene (1-MN) over alumina modified zeolite" Journal of Industrial and Engineering Chemistry 19 (2013) 627-632, 6 pgs.

Pasoni et al., "Heterogenization of H6PMo9V3O40 and palladium acteate in VPI-5 and MCM-41 and their use in the catalytic oxidation of benzene to phenol", Journal of Molecular Catalyst A: Chemical 134 (1998), pp. 229-235.

Tailleur et al. The effect of aromatics on paraffin mild hydrocracking reactions (WNiPd/CeY—Al2O3), Fuel Processing Technology 89 (2008) 808-818, 11 pgs.

Technical Data Sheet, ACS Material AI-MCM-41, www.acsmaterial.com, no date available.

Upare et al. "Cobalt promoted Mo/beta zeolite for selective hydrocracking of tetralin and pyrolysis fuel oil into monocyclic aromatic hydrocarbons" Journal of Industrial and Engineering Chemistry 35 (2016) 99-107, 9 pgs.

Upare et al. "Selective hydrocracking of pyrolysis fuel oil into benzene, toluene and xylene over CoMo/beta zeolite catalyst" Journal of Industrial and Engineering Chemistry 46 (2017) 356-363, 8 pgs.

Wang, et al., "Performance Evaluation of "Ship-In-The-Bottle" Type Heteropoly Acid Encaged Y-Type Zeolite as Catalyst for Oxidative Desulfurization", collect. czech. commun. 2011, vol. 76, No. 12, pp. 1595-1605, Dec. 29, 2011.

Zheng et al., "Controlling Deoxygenation Pathways in Catalytic Fast Pyrolysis of Biomass and Its Components by Using Metal-Oxide Nanocomposites", iScience 23, 100814, Jan. 24, 2020.

Notification of Transmittal of the International Search Report and the Written Opinion of the International Searching Authority, or the Declaration dated Jul. 2, 2024 pertaining to International application No. PCT/US2024/020907 filed Mar. 21, 2024, pp. 1-16.

Bi, Peiyan et al., "Production of aromatics through current-enhanced catalytic conversion of bio-oil tar" Bioresource Technology, Elsevier, Amsterdam, NL, vol. 136, Mar. 7, 2013, pp. 222-229.

* cited by examiner

ONE-STEP FIXED-BED CATALYTIC PROCESS FOR UPGRADING PYROLYSIS OIL TO LIGHTER AROMATIC COMPOUNDS

BACKGROUND

Field

The present disclosure generally relates to methods and systems for upgrading pyrolysis oil, more specifically, methods and systems for upgrading pyrolysis oil to light aromatic compounds using a one-step fixed-bed catalytic process.

Technical Background

Crude oil can be converted to valuable chemical intermediates and products through one or more refinery processes. The refinery processes can include steam cracking, in which larger hydrocarbons in the crude oil are generally cracked to form smaller hydrocarbons. For instance, naphtha streams separated from crude oil and gas condensate streams can be steam cracked to produce greater value products and intermediates. Hydrocarbon gases can also be steam cracked to produce greater value products and intermediates, such as but not limited to olefins. Steam cracking units produce a bottom stream, which is referred to as pyrolysis oil. The pyrolysis oil may include an increased concentration of aromatic compounds compared to crude oil feedstocks. In many crude oil processing facilities, this pyrolysis oil is burned as fuel. However, the aromatic compounds in the pyrolysis oil can be a potential source as a feedstock for converting to greater value chemical products and intermediates, which can be used as building blocks in chemical synthesis processes. For example, aromatic compounds from the pyrolysis oil can be a potential feed for producing xylenes, which can be the initial building blocks for producing terephthalic acid, which can then be used to produce polyesters. The aromatic compounds in the pyrolysis oil can be upgraded to many other greater value aromatic products and intermediates. The market demand for these greater value aromatic compounds continues to grow.

SUMMARY

Multi-ring aromatic compounds in the pyrolysis oil can be converted to light aromatic compounds, which can include benzene, toluene, ethylbenzene, xylenes (BTEX), other aromatic compounds, or combinations of these by various reactions, such as, but not limited to hydrogenation, ring opening, disproportionation, dealkylation, transalkylation, cracking, or aromatic cracking. In general, these conventional processes convert a portion of the multi-ring aromatic compounds in the pyrolysis oil to light aromatic compounds. However, achieving these reactions in a single step process can be complex and insufficient to meet the demand for BTEX. Further, these conventional processes may be difficult to accomplish without employing severe conditions.

Accordingly, ongoing needs exist for improved systems and methods for upgrading pyrolysis oils to produce light aromatic compounds to increase the yield of BTEX using mild processing conditions. Embodiments of the present disclosure meet this need by providing a single-stage fixed-bed catalytic process operable to upgrade pyrolysis oils to di-aromatic compounds, tri-aromatic compounds, BTEX, or combinations of these in a single step. The fixed-bed catalytic process includes a fixed-bed reactor charged with a hydrocracking catalyst configured for use in a fixed bed reactor. The hydrocracking catalyst can be a mixed metal oxide catalyst or a supported metal oxide catalyst. The pyrolysis oil feed may include at least 30 wt. % multi-ring aromatic compounds having boiling point temperatures greater than about 360° C. The fixed-bed reactor system may be operable to convert at least a portion of multi-ring aromatic compounds in the pyrolysis oil to intermediate aromatic compounds in the naphtha and diesel boiling point temperature ranges (50° C. to 360° C.), which aromatic compounds can include but are not limited to di-aromatic compounds, tri-aromatic compounds, benzene, toluene, xylenes, ethylbenzene, or combinations of these. The fixed-bed catalytic process of the present disclosure may also result in reduced concentrations of nitrogen and sulfur compounds in the reactor effluent compared to the pyrolysis oil feeds.

According to one or more aspects of the present disclosure, a method for upgrading pyrolysis oil may include combining a heavy pyrolysis oil and a diluent to produce a pyrolysis oil feed. The heavy pyrolysis oil may comprise greater than or equal to 30 wt. % multi-ring aromatic compounds having boiling point temperatures greater than or equal to 360° C., and the diluent may comprise a benzene, toluene, xylene, a light pyrolysis oil having a density less than 0.98 grams per cubic centimeter, or combinations thereof. The method may further include passing the pyrolysis oil feed to a fixed bed reactor comprising a hydrocracking catalyst comprising pellets having a particle size greater than or equal to 0.1 millimeter. The hydrocracking catalyst may comprise a mixed metal oxide catalyst that may comprise a binder and a plurality of mixed metal oxide particles, where each of the mixed metal oxide particles may comprise iron oxide ($Fe_2O_3$), zirconium oxide ($ZrO_2$), cerium oxide ($CeO_2$), and alumina ($Al_2O_3$). Alternatively, the hydrocracking catalyst may comprise a supported metal oxide catalyst that may comprise molybdenum oxide and nickel oxide supported on a catalyst support material comprising a large-pore alumina having a total pore volume of from 0.8 centimeters cubed per gram to 1.1 centimeters cubed per gram. The method may further include contacting the pyrolysis oil feed with the hydrogen in the presence of the hydrocracking catalyst at reaction conditions in the fixed bed reactor. Contacting the pyrolysis oil feed with hydrogen in the presence of the hydrocracking catalyst may cause at least a portion of the pyrolysis oil to react to form a reaction effluent comprising a concentration of aromatic compounds having boiling point temperatures of from 50° C. to 360° C. greater than the pyrolysis oil feed.

According to one or more other aspects of the present disclosure, a system for upgrading a pyrolysis oil feed may comprise a pyrolysis oil feed stream, where the pyrolysis oil feed stream may comprise a heavy pyrolysis oil having greater than or equal to 30 wt. % multi-ring aromatic compounds having boiling point temperatures greater than or equal to 360° C. and a diluent comprising benzene, toluene, xylene, a light pyrolysis oil having a density less than 0.98 grams per cubic centimeter, or combinations thereof. The system may further include a fixed-bed reactor comprising a hydrocracking catalyst. The hydrocracking catalyst may comprise a mixed metal oxide catalyst that may include a binder and a plurality of mixed metal oxide particles, where each of the mixed metal oxide particles may comprise iron oxide ($Fe_2O_3$), zirconium oxide ($ZrO_2$), cerium oxide ($CeO_2$), and alumina ($Al_2O_3$). Alternatively or additionally, the hydrocracking catalyst may comprise a supported metal oxide catalyst that may include molybdenum oxide and nickel oxide supported on a catalyst support material comprising a large-pore alumina having a total pore volume of from 0.8 centimeters cubed per gram to 1.1 centimeters cubed per gram. The fixed-bed reactor may be operable to contact the pyrolysis oil feed with hydrogen in the presence of the hydrocracking catalyst to produce a reactor effluent that may comprise a greater concentration of aromatic compounds having boiling point temperatures of from 50° C. to 360° C. compared to the pyrolysis oil feed.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
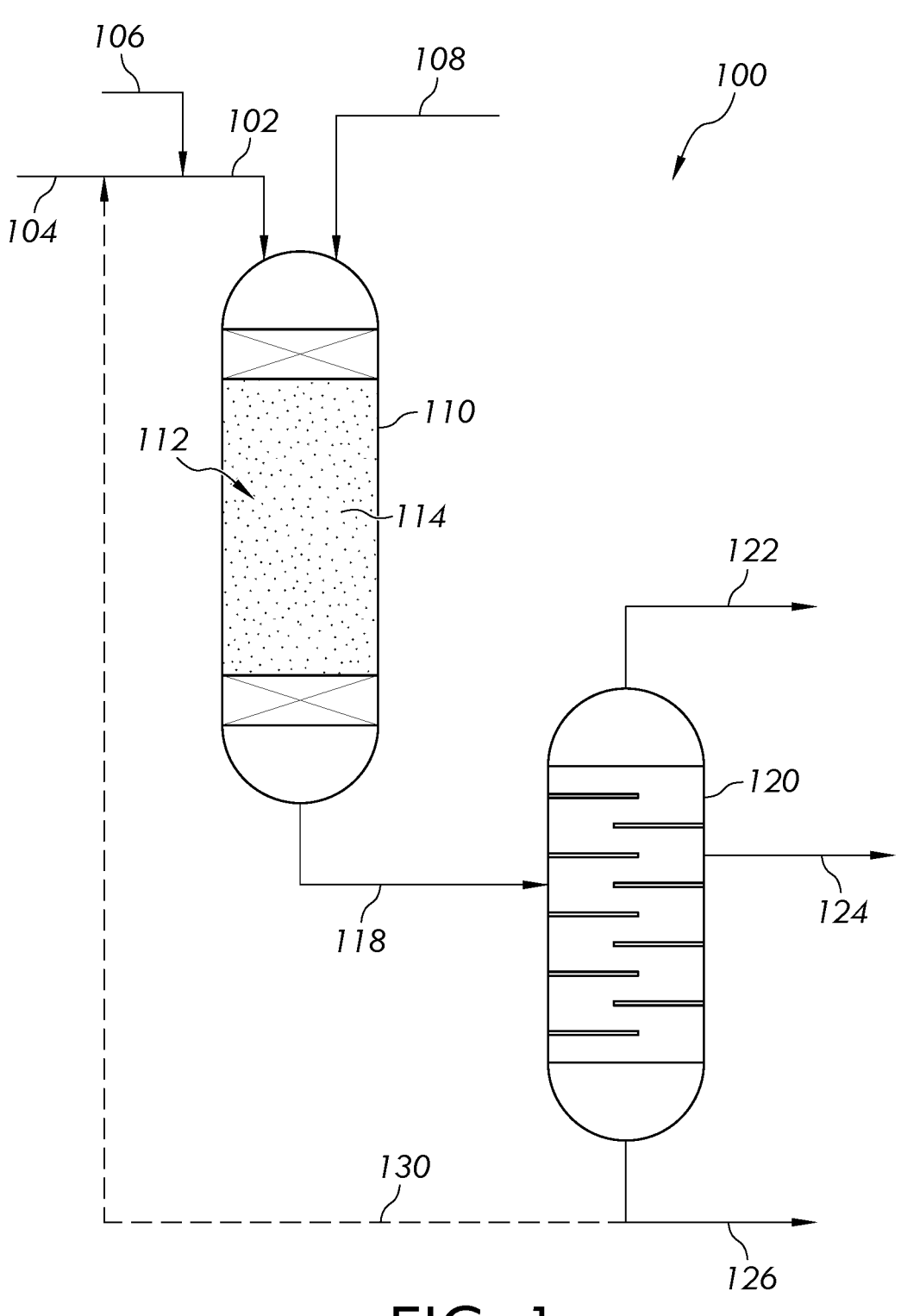
FIG. 1 schematically depicts a generalized flow diagram of a system for upgrading a pyrolysis oil in a fixed-bed catalytic process, according to embodiments shown and described in the present disclosure.
Figure 3:
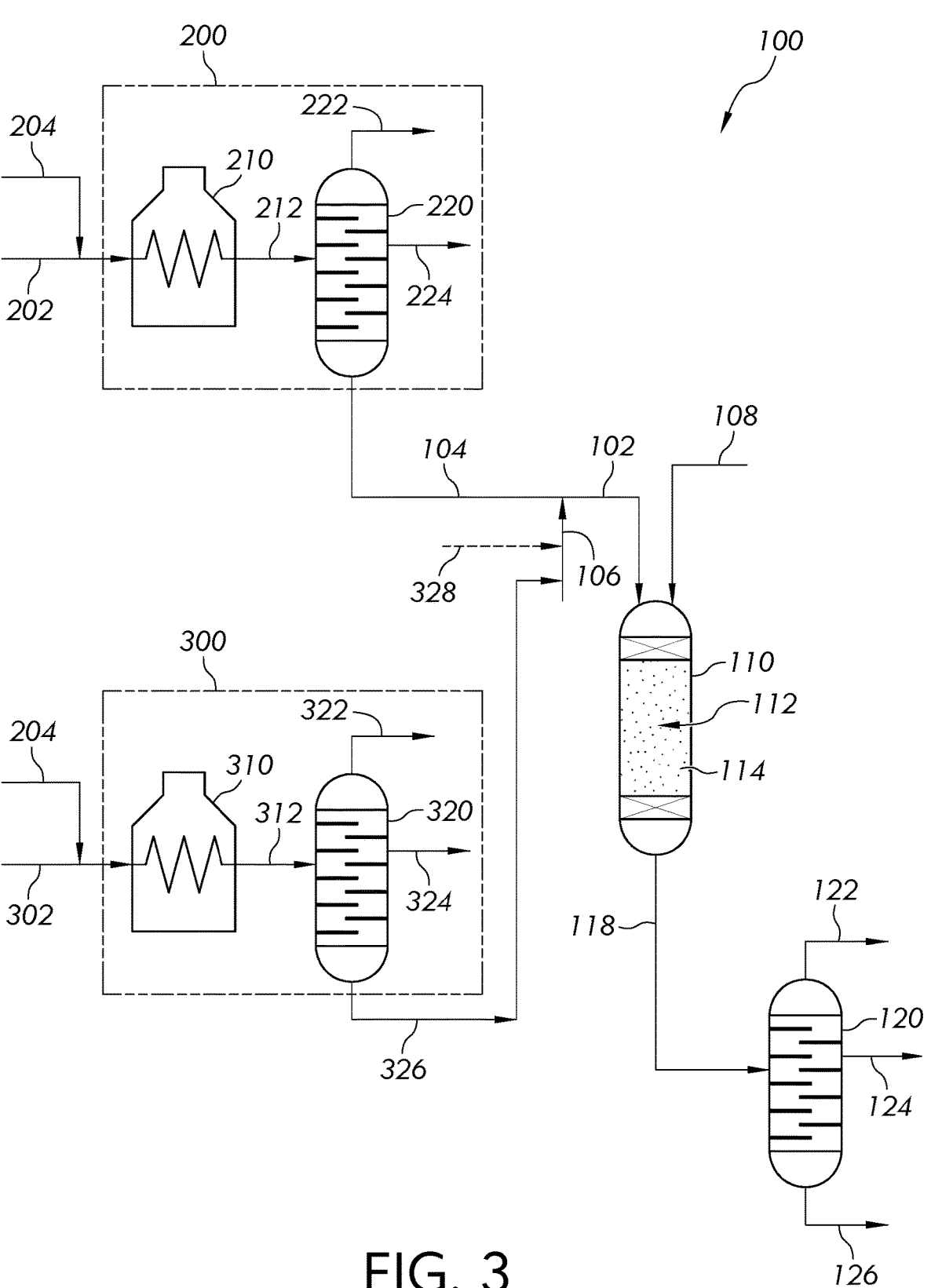
FIG. 3 schematically depicts a generalized flow diagram of another system for upgrading a pyrolysis oil in a fixed-bed catalytic process, according to embodiments shown and described in the present disclosure.

For the purpose of describing the simplified schematic illustration and description of FIGS. 1 and 3, the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream, which exits the depicted system or a system inlet stream which enters the depicted system. Product streams may be further processed in accompanying chemical processing systems or may be commercialized as products or intermediates. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagram of FIGS. 1 and 3. Mixing or combining may also include mixing by directly introducing both streams into a like reactor, separation device, or other system component. For example, it should be understood that when two streams are depicted as being combined directly prior to entering a separator or reactor, that in some embodiments the streams could equivalently be introduced into the separator or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to methods and systems for upgrading pyrolysis oil. Referring now to FIG. 1, one embodiment of a system 100 for upgrading a pyrolysis oil feed 102 is schematically depicted. The system 100 may comprise the pyrolysis oil feed 102 and a fixed-bed reactor 110 comprising a hydrocracking catalyst 114. The pyrolysis oil feed 102 may comprise a heavy pyrolysis oil 104 having greater than or equal to 30 wt. % multi-ring aromatic compounds having boiling point temperatures greater than or equal to 360° C. and a diluent 106 comprising benzene, toluene, xylene, a light pyrolysis oil having a density less than 0.98 grams per cubic centimeter, or combinations of these diluents. The hydrocracking catalyst 114 may comprise: (1) a mixed metal oxide catalyst comprising a binder and a plurality of mixed metal oxide particles, each of the mixed metal oxide particles comprising iron oxide ($Fe_2O_3$), zirconium oxide ($ZrO_2$), cerium oxide ($CeO_2$), and alumina ($Al_2O_3$); or (2) a supported metal oxide catalyst comprising molybdenum oxide and nickel oxide supported on a catalyst support material comprising a large-pore alumina having a total pore volume of from 0.8 centimeters cubed per gram to 1.1 centimeters cubed per gram. The fixed-bed reactor 110 may be operable to contact the pyrolysis oil feed 102 with hydrogen 108 in the presence of the hydrocracking catalyst 114 to produce a reactor effluent 118 which may have a greater concentration of aromatic compounds having boiling point temperatures of from 50° C. to 360° C. compared to the pyrolysis oil feed 102.

The system 100 may be used in a method for upgrading pyrolysis oil. The method may include combining the heavy pyrolysis oil 104 and the diluent 106 to produce the pyrolysis oil feed 102. The heavy pyrolysis oil 104 may comprise greater than or equal to 30 wt. % multi-ring aromatic compounds having boiling point temperatures greater than or equal to 360° C. The diluent 106 may comprise a benzene, toluene, xylene, a light pyrolysis oil having a density less than 0.98 grams per cubic centimeter, or combinations thereof. The method may further include passing the pyrolysis oil feed 102 to the fixed bed reactor 110 comprising the hydrocracking catalyst 114 comprising pellets that may have a particle size greater than or equal to 0.1 millimeter. The hydrocracking catalyst may comprise: (1) a mixed metal oxide catalyst comprising a binder and a plurality of mixed metal oxide particles, each of the mixed metal oxide particles comprising iron oxide ($Fe_2O_3$), zirconium oxide ($ZrO_2$), cerium oxide ($CeO_2$), and alumina ($Al_2O_3$); or (2) a supported metal oxide catalyst comprising molybdenum oxide and nickel oxide supported on a catalyst support material comprising a large-pore alumina having a total pore volume of from 0.8 centimeters cubed per gram to 1.1 centimeters cubed per gram. The method may further include contacting the pyrolysis oil feed 102 with the hydrogen 108 in the presence of the hydrocracking catalyst 114 at reaction conditions in the fixed-bed reactor 110, where the contacting the pyrolysis oil feed 102 with the hydrogen 108 in the presence of the hydrocracking catalyst 114 may cause at least a portion of the pyrolysis oil feed 102 to react to form the reactor effluent 118 comprising a concentration of aromatic compounds having boiling point temperatures of from 50° C. to 360° C. greater than the pyrolysis oil feed 102.

The single step fixed-bed catalytic process of the present disclosure can selectively hydrotreat and hydrocrack heavy pyrolysis oil streams to reduce sulfur and nitrogen and convert heavy multi-ring aromatic compounds (boiling point temperature greater than 360° C.) to greater value di-aromatic compounds, tri-aromatic compounds, light aromatic compounds (BTEX), or combinations of these, which have boiling point temperatures in the naphtha and diesel boiling point ranges (50° C. to 360° C.). The hydrocracking can be accomplished without overcracking the aromatic compounds into light hydrocarbon gases. Thus, the processes of the present disclosure can limit the production of light hydrocarbon gases produced from the pyrolysis oil feed. The fixed-bed process herein can attain a conversion of as high as 93% of multi-ring aromatic compounds having boiling point temperatures greater than 360° C. and can remove more than 90% of the sulfur and nitrogen compounds from the pyrolysis oil feed. The reactions in the fixed-bed reactor process can be conducted at relative mild reaction conditions, such as temperatures of from 350° C. to 400° C. and reaction pressures of from 10 megapascals (MPa) (100 bar) to 15 MPa (150 bar). The milder reaction conditions can improve the economics of converting heavy pyrolysis oil streams to greater value chemical products or intermediates, among other features.

As used in this disclosure, the term "catalyst" refers to any substance that increases the rate of a specific chemical reaction. Catalysts and catalyst components described in this disclosure can be utilized to promote various reactions, such as, but not limited to selective hydrogenation, ring opening, disproportionation, dealkylation, hydrodealkylation, transalkylation, cracking, aromatic cracking, other chemical reactions, or combinations of these.

As used in this disclosure, the term "cracking" refers to a chemical reaction where a molecule having carbon-carbon bonds is broken into more than one molecule by the breaking of one or more of the carbon-carbon bonds; where a molecule that comprises one or more cyclic moieties, such as but not limited to aromatic compounds, undergoes a reaction that opens one or more of the cyclic moieties; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality. As used in this disclosure, the term "hydrocracking" refers to cracking in the presence of added hydrogen.

As used throughout this disclosure, the term "boiling point temperature" or "boiling temperature" refers to boiling point temperature at atmospheric pressure, unless otherwise stated.

As used in this disclosure, the term "initial boiling point" or "IBP" of a composition refers to the temperature at which the constituents of the composition having the lowest boiling point temperature begin to transition from the liquid phase to the vapor phase.

As used in this disclosure, the term "final boiling point" or "FBP" of a composition refers to the temperature at which the greatest boiling temperature constituents of the composition transition from the liquid phase to the vapor phase.

As used in this disclosure, the term "aromatic compounds" refers to compounds having one or more aromatic ring structures. The term "light aromatic compounds" refers to compounds having an aromatic ring, with or without substitution, and from six to eight carbon atoms. The term "BTEX" refers to any combination of one or a plurality of benzene, toluene, ethylbenzene, para-xylene, meta-xylene, and ortho-xylene.

As used in this disclosure, the term "xylenes," when used without a designation of the isomer, such as the prefix para, meta, or ortho, refers to one or more of meta-xylene, ortho-xylene, para-xylene, and mixtures of these xylene isomers.

As used in this disclosure, the term "outer surfaces" refers to surfaces at the outer periphery of a catalyst or catalyst support, such as the mixed metal oxide catalyst or the catalyst support material of the supported metal oxide catalyst.

As used in this disclosure, the term "pore surfaces" refers to the inner surfaces of pores in a catalyst or catalyst support, where the pores include at least the pores in fluid communication with the outer surfaces of the catalyst or catalyst support and are accessible to reactants.

As used in this disclosure, the term "average pore size" of a catalyst or catalyst support refers to the average pore diameter determined by Barrett-Joyner-Halenda (BJH) analysis. BJH analysis measures the amount of a gas (argon) that detaches from a material, such as a porous catalyst zeolite support, at 87 Kelvin over a range of pressures. Using the Kelvin equation, the amount of argon adsorbate removed from the pores of the material and the relative pressure of the system are used to calculate the average pore size of the material.

As used in this disclosure, the term "BET surface area" refers to the surface area of a catalyst determined through gas porosimetry using the Brunauer-Emmett-Teller (BET) analysis.

As used in this disclosure, the term "total pore volume" refers to the total pore volume of a catalyst determined in accordance with the test methods in ASTM D6761.

As used in this disclosure, the term "fixed-bed reactor" refers to a reactor in which a catalyst is contained within the reactor and is maintained is a fixed position within the reactor. A fixed-bed reactor, as used in this disclosure, can include a plurality of material inlets, but has a single effluent outlet.

As used in this disclosure, the terms "upstream" and "downstream" refer to the relative positioning of unit operations with respect to the direction of flow of the process streams. A first unit operation of a system is considered "upstream" of a second unit operation if process streams flowing through the system encounter the first unit operation before encountering the second unit operation. Likewise, the second unit operation is considered "downstream" of the first unit operation if the process streams flowing through the system encounter the first unit operation before encountering the second unit operation.

As used in this disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together upstream of a process unit also is not considered to comprise an intervening system that changes the composition of one or both of the streams or effluents being combined. Simply dividing a stream into two streams having the same composition is also not considered to comprise an intervening system that changes the composition of the stream.

As used in this disclosure, a "separator" refers to any separation device that at least partially separates one or more chemicals that are mixed in a process stream from one another. For example, a separator may selectively separate differing chemical species from one another, forming one or more chemical fractions. Examples of separators include, without limitation, distillation columns, fractionators, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separator and be divided or separated into two or more process streams of desired composition. Further, in some separation processes, a "light fraction" and a "heavy fraction" may separately exit the separator. In general, the light fraction stream has a lesser boiling point than the heavy fraction stream. It should be additionally understood that where only one separator is depicted in a figure or described, two or more separators may be employed to carry out the identical or substantially identical separation. For example, where a distillation column with multiple outlets is described, it is contemplated that several distillation units or other separators arranged in series may equally separate the feed stream and such embodiments are within the scope of the presently described embodiments.

As used in this disclosure, the term "effluent" refers to a stream that is passed out of a reactor, a reaction zone, or a separator following a particular reaction or separation process. Generally, an effluent has a different composition than the stream that entered the separator, reactor, or reaction zone. It should be understood that when an effluent is passed to another system unit, only a portion of that system stream may be passed. For example, a slip stream (having the same composition) may carry some of the effluent away, meaning that only a portion of the effluent may enter the downstream system unit. The term "reaction effluent" more particularly refers to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream, notwithstanding any inert gases or inert diluents added to the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

Referring again to FIG. 1, a system 100 for upgrading pyrolysis oil feed 102 through a fixed-bed catalytic process is schematically depicted. The system 100 for upgrading pyrolysis oil feed 102 comprises a fixed-bed reactor 110. The system 100 may further include a reactor effluent separator 120 disposed downstream of the fixed-bed reactor 110. In embodiments, the fixed-bed reactor 110 may include one or a plurality of fixed-bed reactors operated in series or in parallel. The fixed-bed reactor 110 may include at least one fixed catalyst bed 112 comprising a hydrocracking catalyst 114 disposed in the fixed catalyst bed 112. The fixed-bed reactor 110 may be operable to contact the pyrolysis oil feed 102 with hydrogen 108 in the presence of the hydrocracking catalyst 114 to produce reactor effluent 118. Contacting the pyrolysis oil feed 102 with hydrogen in the presence of the hydrocracking catalyst 114 in the fixed-bed reactor 110 at mild reaction conditions may cause at least a portion of the aromatic compounds in the pyrolysis oil feed 102 to undergo a series of chemical reactions to convert heavy multi-aromatic compounds having boiling point temperatures greater than 360° C. to greater value products or intermediates, such as lighter aromatic compounds having boiling point temperatures in the naphtha and diesel range (50° C. to 360° C.). The lighter aromatic compounds having boiling point temperatures in the naphtha and diesel range can include but not limited to di-aromatic compounds, tri-aromatic compounds, light aromatic compounds having from 6 to 8 carbon atoms (BTEX), or combinations of these. The reactor effluent 118 may have concentrations of aromatic compounds having boiling point temperatures of from 50° C. to 360° C. greater than the pyrolysis oil feed 102. The reactor effluent separator 120 may be operable to separate the reactor effluent 118 into a plurality of product streams, such as but not limited to a light gas stream 122, at least one BTEX stream 124, and a hydrocracking bottom stream 126.

Referring again to FIG. 1, the pyrolysis oil feed 102 may include a heavy pyrolysis oil 104. In embodiments, the pyrolysis oil feed 102 may also include a diluent 106 combined with the heavy pyrolysis oil 104 to produce the pyrolysis oil feed 102. The heavy pyrolysis oil 104 may be a stream from a hydrocarbon processing facility that is rich in aromatic compounds, such as multi-ring aromatic compounds. In embodiments, the heavy pyrolysis oil 104 of the pyrolysis oil feed 102 may be a bottom stream from a steam cracking process, such as a naphtha steam cracking process or a crude oil steam cracking process. As used in the present disclosure, "bottom stream" may refer to a residuum or a fraction of the feed (such as the feed to a steam cracking process) including the least volatile constituents that have not been separately captured as condensed vapor.

Figure 2:
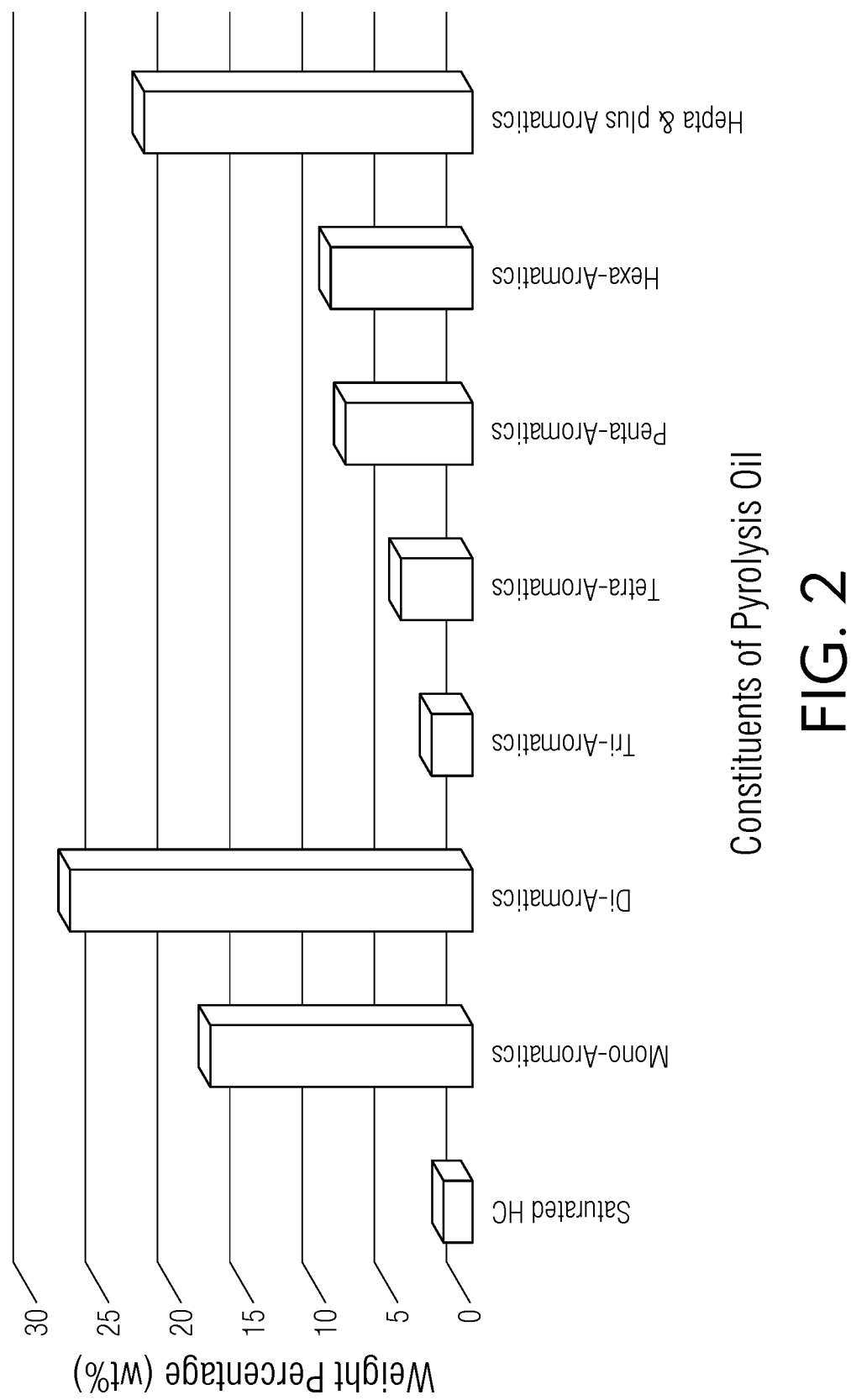
FIG. 2 graphically depicts concentrations of various aromatic compounds in a heavy pyrolysis oil, according to embodiments shown and described in the present disclosure.

The heavy pyrolysis oil 104 may include mono-aromatic compounds and multi-ring aromatic compounds. Multi-ring aromatic compounds may include aromatic compounds including 2, 3, 4, 5, 6, 7, 8, or more than 8 aromatic ring structures. Multi-ring aromatic compounds may include aromatic compounds including greater than or equal to sixteen carbon atoms. The heavy pyrolysis oil 104 may also include other components, such as but not limited to saturated hydrocarbons. Referring to FIG. 2, the composition of a typical heavy pyrolysis oil that can be used as the heavy pyrolysis oil 104 in the pyrolysis oil feed 102 is graphically depicted. The heavy pyrolysis oil depicted in FIG. 2 is a pyrolysis oil produced from steam cracking of crude oil from Saudi Arabia. As shown in FIG. 2, the heavy pyrolysis oil 104 may include mono-aromatics, di-aromatics, tri-aromatics, tetra-aromatics, penta-aromatics, and aromatic compounds having 6 or more aromatic rings (hexa & plus aromatics in FIG. 2). The heavy pyrolysis oil 104 of the pyrolysis oil feed 102 may include elevated concentrations of di-aromatic compounds and aromatic compounds having greater than or equal to six aromatic rings, as indicated by FIG. 2. In embodiments, the heavy pyrolysis oil 104 of the pyrolysis oil feed 102 may include greater than or equal to 50 wt. % multi-ring aromatic compounds, such as greater than or equal to 60 wt. %, greater than or equal to 65 wt. %, greater than or equal to 70 wt. %, greater than or equal to 75 wt. %, or even greater than or equal to 80 wt. % multi-ring aromatic compounds based on a unit weight of the heavy pyrolysis oil 104.

A significant portion of the heavy pyrolysis oil 104 may be multi-ring aromatic compounds having greater than 16 carbon atoms or four or more aromatic rings. The heavy pyrolysis oil 104 may include greater than or equal to 30 wt. % multi-ring aromatic compounds having greater than or equal to sixteen carbon atoms, such as greater than or equal to 35 wt. %, greater than or equal to 40 wt. %, or even greater than or equal to 45 wt. % multi-ring aromatic compounds having greater than or equal to sixteen carbon atoms, where the weight percent is based on the unit weight of the heavy pyrolysis oil 104. The heavy pyrolysis oil 104 may include greater than or equal to 30 wt. % multi-ring aromatic compounds having boiling point temperatures greater than or equal to 360° C., such as greater than or equal to 35 wt. %, greater than or equal to 40 wt. %, or even greater than or equal to 45 wt. % multi-ring aromatic compounds having a boiling point temperature greater than or equal to 360° C., where the weight percent is based on the unit weight of the heavy pyrolysis oil 104. The heavy pyrolysis oil 104 may include greater than or equal to 30 wt. % multi-ring aromatic compounds having boiling point temperatures greater than or equal to 399° C., such as greater than or equal to 35 wt. %, greater than or equal to 40 wt. %, or even greater than or equal to 45 wt. % multi-ring aromatic compounds having a boiling point temperature greater than or equal to 399° C., where the weight percent is based on the unit weight of the heavy pyrolysis oil 104.

In embodiments, the heavy pyrolysis oil 104 may have a density at 15° C. of greater than or equal to 1.00 grams per cubic centimeter (g/cm$^3$), such as greater than or equal to 1.01 g/cm$^3$, greater than or equal to 1.02 g/cm$^3$, from 1.00 g/cm$^3$ to 1.20 g/cm$^3$, from 1.01 g/cm$^3$ to 1.10 g/cm$^3$, or from 1.02 g/cm$^3$ to 1.10 g/cm$^3$, as determined according to the test method in ASTM D5002. In embodiments, the heavy pyrolysis oil 104 may have a dynamic viscosity at 60° C. that is greater than or equal to 10 millipascal seconds (mPa*s), such as from 10 mPa*s to 20 mPa*s, or from 12 mPa*s to 15 mPa*s, where the dynamic viscosity is determined according to the test method in ASTM D7042. In embodiments, the heavy pyrolysis oil 104 may have a kinematic viscosity at 60° C. that is greater than or equal to 10 square millimeters per second (mm$^2$/s), such as greater than or equal to 12 mm$^2$/s, from 10 mm$^2$/s to 20 mm$^2$/s, from 10 mm$^2$/s to 15 mm$^2$/s, from 12 mm$^2$/s to 20 mm$^2$/s, or from 12 mm$^2$/s to 15 mm$^2$/s, as determined according to the test methods in ASTM D7042.

In embodiments, the heavy pyrolysis oil 104 may have an initial boiling point temperature (IBP) of greater than or equal to 150° C., such as from 150° C. to 200° C., or from 150° C. to 180° C., as determined according to the test methods in ASTM D2887. In embodiments, the heavy pyrolysis oil 104 may have a final boiling point temperature (FBP) of greater than or equal to 500° C., such as greater than or equal to 600° C., greater than or equal to 650° C., greater than or equal to 700° C., from 500° C. to 1000° C., from 500° C. to 900° C., from 500° C. to 800° C., from 600° C. to 1000° C., from 600° C. to 900° C., from 600° C. to 800° C., from 650° C. to 1000° C., from 650° C. to 900° C., from 650° C. to 800° C., from 700° C. to 1000° C., from 700° C. to 900° C., or from 700° C. to 800° C., as determined according to the test methods in ASTM D2887 and ISO test method EN 15199-1-3. In embodiments, the heavy pyrolysis oil 104 may have a 50% boiling point temperature of from 300° C. to 500° C., such as from 300° C. to 450° C., from 300° C. to 400° C., from 300° C. to 380° C., from 325° C. to 500° C., from 325° C. to 450° C. from 325° C. to 400° C., from 325° C. to 380° C., from 350° C. to 500° C., from 350° C. to 450° C., from 350° C. to 400° C., or from 350° C. to 380° C., as determined according to the test methods in ASTM D2887.

The heavy pyrolysis oil 104 may have a low concentration of sulfur and sulfur compounds. The heavy pyrolysis oil 104 may have a concentration of sulfur and sulfur-containing compounds of less than or equal to 1000 parts per million by weight (ppmw), such as less than or equal to 500 ppmw, less than or equal to 400 ppmw, or even less than or equal to 300 ppmw, as determined according to the test methods in ASTM D2622. In embodiments, the heavy pyrolysis oil 104 may have a concentration of sulfur and sulfur-containing compounds of from greater than 0 (zero) ppmw to 1000 ppmw, such as from 300 ppmw to 1000 ppmw, or from 300 ppmw to 500 ppmw. In embodiments, the heavy pyrolysis oil 104 may have a concentration of iron, nickel, or both of less than or equal to 100 ppmw, less than or equal to 50 ppmw, or less than or equal to 20 ppmw, as determined according to the test methods in ASTM D2622. Properties for an exemplary embodiment of a heavy pyrolysis oil 104 obtained from steam cracking of naphtha is provided in Table 1.

TABLE 1

Properties of heavy pyrolysis oil, light pyrolysis oil, and an
80:20 mixture of heavy pyrolysis oil and light pyrolysis oil.

| Feed | Light Pyrolysis Oil | Heavy Pyrolysis Oil | 80/20 Heavy/Light Blend | Test Method |
|---|---|---|---|---|
| Density 15° C. (g/cm³) | 0.9484 | 1.0375 | 1.0165 | ASTM D5002 |
| S/N Analysis (grav)_c(N)[mg/kg] | 56.4 | 16.7 | 17.1 | ASTM D4629 |
| S/N Analysis (grav)_c(S)[mg/kg] | 271.6 | 475.3 | 422.6 | ASTM D5453 |
| Dynamic Viscosity [mPa*s] | 1.272 | 13.797 | 6.867 | ASTM D7042 |
| Kinematic Viscosity [mm²/s] | 1.389 | 13.684 | 6.952 | ASTM D7042 |
| Viscosity_Temperature [° C.] | 60 | 60 | 60 | N/A |
| SIMDIST analysis_IBP [° C.] | 78.3 | 165.6 | 135.9 | ASTM D2887* |
| SIMDIST analysis_5% [° C.] | 146.7 | 188.9 | 175.4 | ASTM D2887 |
| SIMDIST analysis_10% [° C.] | 162.8 | 209.4 | 179.7 | ASTM D2887 |
| SIMDIST analysis_20% [° C.] | 179.4 | 230 | 196.8 | ASTM D2887 |
| SIMDIST analysis_30% [° C.] | 188.3 | 265 | 204.1 | ASTM D2887 |
| SIMDIST analysis_40% [° C.] | 189.4 | 306.7 | 218.2 | ASTM D2887 |
| SIMDIST analysis_50% [° C.] | 190 | 378.9 | 242.3 | ASTM D2887 |
| SIMDIST analysis_60% [° C.] | 194.4 | 463.9 | 297.5 | ASTM D2887 |
| SIMDIST analysis_70% [° C.] | 203.9 | 527.2 | 381.2 | ASTM D2887 |
| SIMDIST analysis_80% [° C.] | 210 | 578.9 | 494.3 | ASTM D2887 |
| SIMDIST analysis_90% [° C.] | 256.1 | 641.1 | 583.7 | ASTM D2887 |
| SIMDIST analysis_95% [° C.] | 265.6 | 686.7 | 640.6 | ASTM D2887 |
| SIMDIST analysis_FBP [° C.] | 361.1 | 721.1 | 711.9 | ASTM 2887** |
| S [ppm] (XRF) | 251.4 | 455.7 | 414 | ASTM D2622 |
| Fe [ppm] (XRF) | 0 | 12.8 | 10 | ASTM D2622 |
| Ni [ppm] (XRF) | 0.2 | 0.6 | 0.5 | ASTM D2622 |

*Test method ASTM D2887 was performed using a 6 dual tower gas chromatograph from Agilent Technologies, Inc.
**ISO test method EN 15199-1-3 was used to recovery constituents having boiling points greater than or equal to 750° C.

As previously discussed, in embodiments, the pyrolysis oil feed 102 may include a diluent 106 combined with the heavy pyrolysis oil 104. Due to the high viscosity (dynamic viscosity>10 mPa*s or kinematic viscosity>10 mm²/s) of the heavy pyrolysis oil 104, the diluent 106 may be added to the heavy pyrolysis oil to increase the fluidity of the pyrolysis oil feed 102. The inclusion of the diluent 106 in the pyrolysis oil feed 102 may allow the pyrolysis oil feed 102 to have increased contact with the surfaces of the hydrocracking catalyst 114 in the fixed-bed reactor 110. Diluents 106 may include but are not limited to a light pyrolysis oil, benzene, mixed xylenes, toluene, or combinations of these. In embodiments, the diluent 106 may be toluene due to the greater solubility of heavy pyrolysis oils in toluene compared to benzene and xylenes.

In embodiments, the diluent 106 may be a light pyrolysis oil, which may be a bottom stream derived from separation of a gas cracker effluent produced through steam cracking of a hydrocarbon gas, such as a steam cracking a gas condensate. The properties of one embodiment of a diluent comprising light pyrolysis oil from a hydrocarbon gas steam cracking system is provided in Table 1. In embodiments, the light pyrolysis oil may have a density at 15° C. of less than 0.98 g/cm³, such as less than or equal to 0.97 g/cm³, less than or equal to 0.96 g/cm³, from 0.92 g/cm³ to 0.978 g/cm³, or from 0.92 g/cm³ to 0.97 g/cm³, as determined from the test method in ASTM D5002. In embodiments, the light pyrolysis oil may have a dynamic viscosity at 60° C. that is less than or equal to 5 millipascal seconds (mPa*s), such as less than or equal to 4 mPa*s, from 0.5 mPa*s to 5 mPa*s, from 1 mPa*s to 4 mPa*s, or from 1 mPa*s to 2 mPa*s, where the dynamic viscosity is determined according to the test method in ASTM D7042. In embodiments, the light pyrolysis oil may have a kinematic viscosity at 60° C. that is less than or equal to 5 square millimeters per second (mm²/s), such as less than or equal to 4 mm²/s, less than or equal to 2 mm²/s, from 0.5 mm²/s to 5 mm²/s, from 0.5 mm²/s to 4 mm²/s, from 1 mm²/s to 5 mm²/s, or from 1 mm²/s to 2 mm²/s, as determined according to the test methods in ASTM D7042.

In embodiments, the light pyrolysis oil may have an initial boiling point temperature (IBP) of less than or equal to 120° C., such as less than 100° C., from 40° C. to 120° C., or from 50° C. to 100° C., as determined according to the test methods in ASTM D2887. In embodiments, the light pyrolysis oil may have a final boiling point temperature (FBP) of less than 500° C., such as less than or equal to 450° C., less than or equal to 400° C., from 250° C. to less than 500° C., from 250° C. to 450° C., from 250° C. to 400° C., from 300° C. to less than 500° C., from 300° C. to 475° C., from 300° C. to 450° C., or from 300° C. to 400° C., as determined according to the test methods in ASTM D2887. In embodiments, the light pyrolysis oil may have a 50% boiling point temperature of less than 230° C., such as from 150° C. to 230° C., from 150° C. to 225° C., from 150° C. to 200° C., from 175° C. to 230° C., from 175° C. to 225° C., from 175° C. to 200° C. from 180° C. to 230° C., from 180° C. to 225° C., or from 180° C. to 200° C., as determined according to the test methods in ASTM D2887.

The light pyrolysis oil used as the diluent 106 in the pyrolysis oil feed 102 may also have a low concentration of sulfur and sulfur compounds. The light pyrolysis oil may have a concentration of sulfur and sulfur-containing compounds of less than or equal to 500 parts per million by weight (ppmw), such as less than or equal to 400 ppmw, or even less than or equal to 300 ppmw, as determined according to the test methods in ASTM D2622. In embodiments, the light pyrolysis oil may have a concentration of sulfur and sulfur-containing compounds of from greater than 0 (zero) ppmw to 500 ppmw, such as from 1 ppmw to 500 ppmw, from 1 ppmw to 400 ppmw, or from 1 to 300 ppmw. In embodiments, the light pyrolysis oil may have a concentration of iron, nickel, or both of less than or equal to 100 ppmw, less than or equal to 50 ppmw, less than or equal to 20 ppmw, or even less than or equal to 10 ppmw, such as greater than or equal to 0 (zero) ppmw to less than or equal to 100 ppmw, as determined according to the test methods in ASTM D2622.

The pyrolysis oil feed 102 may include from 10 wt. % to 100 wt. % heavy pyrolysis oil 104 based on the total weight of the pyrolysis oil feed 102. The pyrolysis oil feed 102 may include from 10 wt. % to 90 wt. %, from 10 wt. % to 80 wt. %, from 20 wt. % to 100 wt. %, from 20 wt. % to 90 wt. %, from 20 wt. % to 80 wt. %, from 30 wt. % to 100 wt. %, from 30 wt. % to 90 wt. %, from 30 wt. % to 80 wt. %, from 50 wt. % to 100 wt. %, from 50 wt. % to 90 wt. %, from 50 wt. % to 80 wt. %, from 60 wt. % to 100 wt. %, from 60 wt. % to 90 wt. %, from 60 wt. % to 80 wt. %, from 70 wt. % to 100 wt. %, or from 70 wt. % to 90 wt. % heavy pyrolysis oil 104 based on the total weight of the pyrolysis oil feed 102. The pyrolysis oil feed 102 may include from 0 (zero) wt. % to 90 wt. % diluent 106 based on the total weight of the pyrolysis oil feed 102. The pyrolysis oil feed 102 may include from 0 wt. % to 80 wt. %, from 0 wt. % to 70 wt. %, from 0 wt. % to 60 wt. %, from 10 wt. % to 90 wt. %, from 10 wt. % to 80 wt. %, from 10 wt. % to 70 wt. %, from 10 wt. % to 60 wt. %, from 30 wt. % to 90 wt. %, from 30 wt. % to 80 wt. %, from 30 wt. % to 70 wt. %, from 30 wt. % to 60 wt. %, from 50 wt. % to 90 wt. %, from 50 wt. % to 80 wt. %, from 50 wt. % to 70 wt. %, from 60 wt. % to 90 wt. %, from 60 wt. % to 80 wt. %, or from 70 wt. % to 90 wt. % diluent 106 based on the total weight of the pyrolysis oil feed 102. In embodiments, diluent 106 may be mixed with the heavy pyrolysis oil 104 in a mixing unit disposed upstream of the fixed-bed reactor 110 to produce the pyrolysis oil feed 102, which may then be passed to the fixed-bed reactor 110. In embodiments, the pyrolysis oil feed 102 may not include a diluent 106 added to the heavy pyrolysis oil 104 upstream of the fixed-bed reactor 110. However, in these embodiments, the pyrolysis oil feed 102 may still include small amounts, such as less than 10 wt. %, toluene, xylene, or benzene that may be carried through from the process producing the heavy pyrolysis oil 104.

In embodiments, the pyrolysis oil feed 102 may comprise from 75 wt. % to 85 wt. % of the heavy pyrolysis oil 104 and from 15 wt. % to 25 wt. % of a light pyrolysis oil as the diluent 106, based on the total weight of the pyrolysis oil feed. In embodiments, the pyrolysis oil feed 102 may comprise 80 wt. % of the heavy pyrolysis oil 104 and 20 wt. % of the light pyrolysis oil as the diluent 106, based on the total weight of the pyrolysis oil feed. The pyrolysis oil feed 102 may comprise greater than or equal to 30 weight percent (wt. %), such as greater than or equal to 35 wt. %, greater than or equal to 40 wt. %, greater than or equal to 40 wt. %, greater than or equal to 45 wt. %, or greater than or equal to 50 wt. % multi-ring aromatic compounds having greater than or equal to sixteen carbon atoms based on the total weight of the heavy pyrolysis oil in the pyrolysis oil feed.

In embodiments, the pyrolysis oil feed 102 comprising a mixture of the heavy pyrolysis oil 104 and a light pyrolysis oil as the diluent may have a density at 15° C. of from 0.98 g/cm$^3$ to 1.03 g/cm$^3$, such as from 0.98 g/cm$^3$ to 1.02 g/cm$^3$, from 1.00 g/cm$^3$ to 1.03 g/cm$^3$, or from 1.00 g/cm$^3$ to 1.02 g/cm$^3$, as determined from the test method in ASTM D5002. In embodiments, the pyrolysis oil feed 102 comprising a mixture of the heavy pyrolysis oil 104 and a light pyrolysis oil as the diluent may have a dynamic viscosity at 60° C. that is from 5 mPa*s to 10 mPa*s, from greater than 5.0 mPa*s to less than 10.0 mPa*s, from 5.0 mPa*s to 9.5 mPa*s, from 5.0 mPa*s to 9.0 mPa*s, from 5.5 mPa*s to 10.0 mPa*s, from 5.5 mPa*s to 9.5 mPa*s, from 5.5 mPa*s to 9.0 mPa*s, from 6.0 mPa*s to 10.0 mPa*s, from 6.0 mPa*s to 9.5 mPa*s, or from 6.0 mPa*s to 9.0 mPa*s, where the dynamic viscosity is determined according to the test method in ASTM D7042. In embodiments, the pyrolysis oil feed 102 comprising a mixture of the heavy pyrolysis oil 104 and a light pyrolysis oil as the diluent may have a kinematic viscosity at 60° C. that is from 5.0 mm$^2$/s to 10.0 mm$^2$/s, such as from 5.0 mm$^2$/s to 9.5 mm$^2$/s, from 5.0 mm$^2$/s to 9.0 mm$^2$/s, from 5.5 mm$^2$/s to 10 mm$^2$/s, from 5.5 mm$^2$/s to 9.5 mm$^2$/s, from 5.5 mm$^2$/s to 9.0 mm$^2$/s, from 6.0 mm$^2$/s to 10.0 mm$^2$/s, from 6.0 mm$^2$/s to 9.5 mm$^2$/s, or from 6.0 mm$^2$/s to 9.0 mm$^2$/s, as determined according to the test methods in ASTM D7042.

In embodiments, the pyrolysis oil feed 102 comprising a mixture of the heavy pyrolysis oil 104 and a light pyrolysis oil as the diluent may have an initial boiling point temperature (IBP) of from 120° C. to 150° C., such as from 120° C. to 145° C., from 125° C. to 150° C., or from 125° C. to 145° C., as determined according to the test methods in ASTM D2887. In embodiments, the pyrolysis oil feed 102 comprising a mixture of the heavy pyrolysis oil 104 and a light pyrolysis oil as the diluent may have a final boiling point temperature (FBP) of greater than or equal to 500° C., such as greater than or equal to 600° C., greater than or equal to 650° C., greater than or equal to 700° C., from 500° C. to 1000° C., from 500° C. to 900° C., from 500° C. to 800° C., from 600° C. to 1000° C., from 600° C. to 900° C., from 600° C. to 800° C., from 650° C. to 1000° C., from 650° C. to 900° C., from 650° C. to 800° C., from 700° C. to 1000° C., from 700° C. to 900° C., or from 700° C. to 800° C., as determined according to the test methods in ASTM D2887. In embodiments, the pyrolysis oil feed 102 comprising a mixture of the heavy pyrolysis oil 104 and a light pyrolysis oil as the diluent may have a 50% boiling point temperature of from 200° C. to 300° C., from 200° C. to 290° C., from 200° C. to 275° C., from 225° C. to 300° C., from 225° C. to 290° C., from 225° C. to 275° C., from 240° C. to 300° C., from 240° C. to 290° C., or from 240° C. to 275° C., as determined according to the test methods in ASTM D2887.

The pyrolysis oil feed 102 comprising a mixture of the heavy pyrolysis oil 104 and a light pyrolysis oil as the diluent may also have a low concentration of sulfur and sulfur compounds. The pyrolysis oil feed 102 comprising a mixture of the heavy pyrolysis oil 104 and a light pyrolysis oil as the diluent may have a concentration of sulfur and sulfur-containing compounds of less than or equal to 500 parts per million by weight (ppmw), such as less than or equal to 400 ppmw, or even less than or equal to 300 ppmw, as determined according to the test methods in ASTM D2622. In embodiments, the pyrolysis oil feed 102 comprising a mixture of the heavy pyrolysis oil 104 and a light pyrolysis oil as the diluent may have a concentration of sulfur and sulfur-containing compounds of from greater than 0 (zero) ppmw to 500 ppmw, such as from 1 ppmw to 500 ppmw, from 1 ppmw to 400 ppmw, or from 1 to 300 ppmw. In embodiments, the pyrolysis oil feed 102 comprising a mixture of the heavy pyrolysis oil 104 and a light pyrolysis oil as the diluent may have a concentration of iron, nickel, or both of less than or equal to 100 ppmw, less than or equal to 50 ppmw, less than or equal to 20 ppmw, or even less than or equal to 10 ppmw, such as greater than or equal to 0 (zero) ppmw to less than or equal to 100 ppmw, as determined according to the test methods in ASTM D2622. The properties of one embodiment of the pyrolysis oil feed 102 comprising a mixture of the heavy pyrolysis oil 104 and a light pyrolysis oil as the diluent is provided in Table 1. In embodiments, the pyrolysis oil feed 102 may further comprise a bottom stream 130 from the hydrocracking effluent separator 120 disposed downstream of the fixed-bed reactor 110.

Referring now to FIG. 3, the system 100 may integrate the fixed-bed reactor 110 with one or more steam cracking systems, such as but not limited to a naphtha steam cracking system 200, a hydrocarbon gas steam cracking system 300, or both, disposed upstream of the fixed-bed reactor 110 to provide one or more constituents of the pyrolysis oil feed 102. In embodiments, the system 100 may comprise a naphtha steam cracking system 200 disposed upstream of the fixed-bed reactor 110. The naphtha steam cracking system 200 may include a naphtha steam cracker unit 210 and a naphtha steam cracker effluent separator 220 disposed downstream of the naphtha steam cracker unit 210. The naphtha steam cracking system 200 may be operable to steam crack a naphtha feed 202 to produce one or more chemical products and a heavy pyrolysis oil 104, which may be passed to the fixed-bed reactor 110 as at least a portion of the pyrolysis oil feed 102.

The naphtha feed 202 may comprise hydrocarbons having boiling point temperatures in the naphtha range of from 30° C. to 225° C. The naphtha feed 202 may include hydrocarbons having from 5 to 12 carbon atoms. The naphtha feed 202 may be combined with steam 204 upstream of the naphtha steam cracker unit 210, or the naphtha feed 202 and steam 204 may be passed separately and independently to the naphtha steam cracker unit 210 and mixed in the naphtha steam cracker unit 210. The naphtha steam cracker unit 210 may comprise a convection zone and a pyrolysis zone. The convection zone may preheat the naphtha feed 202 and steam 204 to the operating temperature of the pyrolysis zone. In embodiments, the pyrolysis zone may be operated at a temperature of from 750° C. to 1000° C., or from 800° C. to 950° C. The pyrolysis zone may operate with a residence time of from 0.05 seconds to 2 seconds. The mass ratio of steam 204 to the naphtha feed 204 may be from about 0.3:1 to about 2:1. In the pyrolysis zone, at least a portion of the hydrocarbons from the naphtha feed 204 undergo thermal cracking reactions to produce a naphtha steam cracker effluent 212 comprising one or more products, which may include greater value chemical products or intermediates. One or more products may include but are not limited to olefins (ethylene, propylene, mixed butenes), light aromatic compounds (BTEX), other products, or combinations of products.

The naphtha steam cracker effluent 212 may be passed from the naphtha steam cracker unit 210 to a naphtha cracker effluent separator 220, which may include one or more separation devices. The naphtha cracker effluent separator 220 may be operable to separate the naphtha steam cracker effluent 212 into a light gas stream 222, one or more product streams 224, and the heavy pyrolysis oil 104. The heavy pyrolysis oil 104 may be the bottoms from the naphtha cracker effluent separator 220 and may have any of the compositions or properties previously discussed herein for the heavy pyrolysis oil 104. The heavy pyrolysis oil 104 may be passed directly from the naphtha cracker effluent separator 220 to the fixed-bed reactor 110 without passing through any intervening reaction systems of separators that separate one or more components from the heavy pyrolysis oil 104. The heavy pyrolysis oil 104 may comprise at least a portion of the pyrolysis oil feed 102 to the fixed-bed reactor 110 of system 100.

Referring again to FIG. 3, in embodiments, the system 100 may comprise a hydrocarbon gas steam cracking system 300 disposed upstream of the fixed-bed reactor 110. The hydrocarbon gas steam cracking system 300 may include a gas steam cracker unit 310 and a gas steam cracker effluent separator 320 disposed downstream of the gas steam cracker unit 310. The hydrocarbon gas steam cracking system 300 may be operable to steam crack a light hydrocarbon gas 302 in the presence of steam 204 to produce one or more chemical products and a light pyrolysis oil 326, which may be passed to the fixed-bed reactor 110 as at least a portion of the pyrolysis oil feed 102. The light pyrolysis oil 326 may be used as the diluent 106 combined with the heavy pyrolysis oil 104 upstream of the fixed-bed reactor 110.

The light hydrocarbon gas 302 may comprise hydrocarbons having boiling point temperatures less than or equal to 50° C., or less than or equal to 30° C. The light hydrocarbon gas 302 may include hydrocarbons having less than or equal to 5 carbon atoms, or less than or equal to 4 carbon atoms. The light hydrocarbon gas 302 may be combined with steam 204 upstream of the gas steam cracker unit 310, or the light hydrocarbon gas 302 and steam 204 may be passed separately and independently to the gas steam cracker unit 310 and mixed in the gas steam cracker unit 310. The gas steam cracker unit 310 may comprise a convection zone and a pyrolysis zone. The convection zone may preheat the light hydrocarbon gas 302 and steam 204 to the operating temperature of the pyrolysis zone. In embodiments, the pyrolysis zone may be operated at a temperature of from 750° C. to 1000° C., or from 800° C. to 950° C. The pyrolysis zone may operate with a residence time of from 0.05 seconds to 2 seconds. The mass ratio of steam 204 to the light hydrocarbon gas 302 may be from about 0.3:1 to about 2:1. In the pyrolysis zone, at least a portion of the hydrocarbons from the light hydrocarbon gas 302 undergo thermal cracking reactions to produce a gas steam cracker effluent 312 comprising one or more products, which may include greater value chemical products or intermediates. One or more products may include but are not limited to light olefins, such as but not limited to ethylene, propylene, mixed butenes, or combinations of these.

The gas steam cracker effluent 312 may be passed from the gas steam cracker unit 310 to a gas cracker effluent separator 320, which may include one or more separation devices. The gas cracker effluent separator 320 may be operable to separate the gas steam cracker effluent 312 into a light gas stream 322, one or more product streams 324, and the light pyrolysis oil 326. The light pyrolysis oil 326 may be the bottoms from the gas cracker effluent separator 320 and may have any of the compositions or properties previously discussed herein for the light pyrolysis oil. The light pyrolysis oil 326 may be passed directly from the gas cracker effluent separator 320 to the fixed-bed reactor 110 without passing through any intervening reaction systems of separators that separate one or more components from the light pyrolysis oil 326. The light pyrolysis oil 326 may comprise at least a portion of the diluent 106 combined with the heavy pyrolysis oil 104 and passed to the fixed-bed reactor 110 of system 100. In embodiments, the light pyrolysis oil 326 may be combined with a light aromatic diluent stream 328 to produce the diluent 106. As previously discussed, the light aromatic diluent stream 328 may include one or more light aromatic compounds, such as but not limited to BTEX.

Although described in the context of the naphtha steam cracking system 220 and the hydrocarbon gas steam cracking system 320 shown in FIG. 3, it is understood that the heavy pyrolysis oil 104, the light pyrolysis oil, or both may be produce through steam cracking other hydrocarbon streams, such as crude oil, gas condensate, distillation residues (such as but not limited to atmospheric residue, vacuum gas oils, vacuum residues, etc.) or other heavy hydrocarbon oils.

Referring again to FIG. 1, the pyrolysis oil feed 102 may be passed to the fixed-bed reactor 110. The fixed-bed reactor 110 may be operable to contact the pyrolysis oil feed 102 with hydrogen 108 in the presence of a hydrocracking catalyst 114 to produce the reactor effluent 118. Contacting the pyrolysis oil feed 102 with hydrogen 108 in the presence of the hydrocracking catalyst 114 may convert at least a portion of the multi-ring aromatic compounds in the pyrolysis oil feed 102 to light aromatic compounds, such as but not limited to benzene, toluene, mixed xylenes, ethylbenzene, or combinations of these. The pyrolysis oil feed 102 may have any of the compositions and properties previously provided herein for the pyrolysis oil feed. The hydrogen 108 may include a recycled hydrogen stream or supplemental hydrogen from an external hydrogen source inside or outside the battery limits of the refinery. The hydrogen 108 may be passed directly to the fixed-bed reactor 110 or may be combined with the pyrolysis oil feed 102 upstream of the fixed-bed reactor 110. The hydrogen 108 may be used to pressurize the fixed-bed reactor 110 to the operating pressure.

The fixed-bed reactor 110 comprises at least one fixed catalyst bed 112, which is maintained in a fixed position within the fixed-bed reactor 110. In embodiments, the fixed-bed reactor 110 may include spacers upstream and downstream of the fixed catalyst bed 112 to maintain the hydrocracking catalyst 114 in the fixed catalyst bed 112. In embodiments, the fixed catalyst bed 112 may be a packed bed. In embodiments, the fixed-bed reactor 110 may be characterized by one or a plurality of fluid inlets and a single fluid outlet, where the entire reactor effluent 118 passes out of the fixed-bed reactor 110 through the single fluid outlet. The fixed-bed reactor 110 may be a continuous flow reactor. In embodiments, the fixed-bed reactor 110 may comprise one or a plurality of fixed-bed reactors. When the fixed-bed reactor 110 comprises a plurality of fixed-bed reactors, the plurality of fixed-bed reactors may be operated in series, in parallel, or a combination thereof. In embodiments, the fixed-bed reactor 110 may include a plurality of fixed-bed reactors 110 operated in parallel.

The hydrocracking catalyst 114 may be catalytically active to convert multi-ring aromatic compounds having greater than or equal to sixteen carbon atoms in the pyrolysis oil feed 102 to lower molecular weight aromatic compounds, such as but not limited to light aromatic compounds having from 6-8 carbon atoms, di-aromatic compounds, tri-aromatic compounds, or combinations of these. The hydrocracking catalyst 114 may be catalytically active to convert multi-ring aromatic compounds having boiling point temperatures greater than 360° C. in the pyrolysis oil feed 102 to produce lighter aromatic compounds having boiling point temperatures in the naphtha boiling range (boiling point temperature from 30° C. to 200° C.), the diesel boiling range (boiling point temperature from 200° C. to 360° C.), or both. The hydrocracking catalyst may be a mixed metal oxide catalyst comprising a binder and a plurality of mixed metal oxide particles, each of the mixed metal oxide particles comprising iron oxide (Fe$_2$O$_3$), zirconium oxide (ZrO$_2$), cerium oxide (CeO$_2$), and alumina (Al$_2$O$_3$); or a supported metal oxide catalyst comprising molybdenum oxide and nickel oxide supported on a catalyst support material comprising a large-pore alumina having a total pore volume of from 0.8 centimeters cubed per gram to 1.1 centimeters cubed per gram.

In embodiments, the hydrocracking catalyst 114 may be a mixed metal oxide catalyst in the form of a plurality of catalyst pellets suitable for use in a fixed-bed reactor. The mixed metal oxide catalyst may be catalytically active to convert multi-ring aromatic compounds having greater than or equal to sixteen carbon atoms in the pyrolysis oil feed 102 to light aromatic compounds, di-aromatic compounds, tri-aromatic compounds, or combinations of these. Each of the catalyst pellets of the mixed metal oxide catalyst comprises a plurality of mixed metal oxide particles (MMO particles) and a binder. Each of the plurality of MMO particles may include a plurality of metal oxides that are different from one another. The plurality of metal oxides of the MMO particles may include oxides of metals in groups 3-13 of the International Union of Pure and Applied Chemistry (IUPAC) periodic table. In embodiments, the plurality of metal oxides of the MMO particles may include combinations of oxides of iron, zirconium, cerium, aluminum, tungsten, molybdenum, and titanium. The MMO particles may also include oxides of metalloids, such as oxides of silicon. The MMO particles may comprise oxides of metals or metalloids selected from the group consisting of iron oxide (Fe$_2$O$_3$), zirconium oxide (ZrO$_2$), cerium oxide (CeO$_2$), aluminum oxide (alumina) (Al$_2$O$_3$), silica (SiO$_2$), tungsten oxide (WO$_3$), molybdenum oxide (MoO$_3$), titanium oxide (TiO$_2$), and combinations of these.

The MMO particles of the mixed metal oxide catalyst may include iron oxide as one of the plurality of metal oxides. In embodiments, the MMO particles may include from 60 wt. % to 95 wt. % iron oxide, such as from 70 wt. % to 90 wt. %, from 75 wt. % to 85 wt. %, or from 80 wt. % to 85 wt. % iron oxide, based on the total weight of the MMO particles. The MMO particles may include zirconium oxide as one of the plurality of metal oxides. In embodiments, the MMO particles may include from 1 wt. % to 20 wt. % zirconium oxide, such as from 1 wt. % to 15 wt. %, from 2.5 wt. % to 12.5 wt. %, or from 5 wt. % to 10 wt. % zirconium oxide, based on the total weight of the MMO particles. The MMO particles may include cerium oxide as one of the plurality of metal oxides. In embodiments, the MMO particles may include from 0.1 wt. % to 10 wt. % cerium oxide, such as from 0.5 wt. % to 7.5 wt. %, from 0.5 wt. % to 5 wt. %, or from 1 wt. % to 5 wt. %, based on the total weight of the MMO particles. The MMO particles may include aluminum oxide (alumina) as one of the plurality of metal oxides. In embodiments, the MMO particles may include from 1 wt. % to 20 wt. % aluminum oxide (alumina), such as from 2.5 wt. % to 15 wt. %, from 3 wt. % to 12.5 wt. %, or from 5 wt. % to 10 wt. %, based on the total weight of the MMO particles. The weight percentages of the plurality of metal oxides of the MMO particles are based on the total weight of the MMO particles. The MMO particles may comprise, consist of, or consist essentially of from 60 wt. % to 95 wt. % iron oxide, from 1 wt. % to 20 wt. % zirconium oxide, from 0.1 wt. % to 10 wt. % cerium oxide, and from 1 wt. % to 20 wt. % aluminum oxide (alumina), based on the total weight of the MMO particles. In embodiments, the MMO particles may include 83 wt. % iron oxide, 7.5 wt. % zirconium oxide, 2.5 wt. % cerium oxide, and 7.0 wt. % aluminum oxide (alumina), based on the total weight of the MMO particles. In embodiments, the MMO particles do not include silica. In embodiments, the MMO particles may include the plurality of metal oxides mixed and fused or agglomerated together to form the MMO particles comprising a homogeneous solid mixture of the metal oxides instead of one or more metal oxides deposited on a surface of a support material. The MMO particles may be prepared by a co-precipitation method to produce the MMO particles comprising each of the plurality of different metal oxides distributed throughout the MMO particles. Following co-precipitation, the MMO particles may be pulverized to form a powder.

The MMO particles may comprise nanoparticles, which may have a particle size of from 20 nm to 200 nm, such as from 20 nm to 175 nm, from 20 nm to 150 nm, from 20 nm to 125 nm, from 20 nm to 100 nm, from 20 nm to 75 nm, from 20 nm to 50 nm, from 20 nm to 40 nm, from 20 nm to 30 nm, from 25 nm to 200 nm, from 30 nm to 200 nm, from 40 nm to 200 nm, from 50 nm to 200 nm, from 75 nm to 200 nm, from 100 nm to 200 nm, from 125 nm to 200 nm, from 150 nm to 200 nm, from 175 nm to 200 nm, from 50 nm to 175 nm, from 75 nm to 150 nm, from 100 nm to 125 nm, or any subset thereof. The particle size of the MMO particles refers to the largest cross-particle dimension of the MMO particles. In embodiments, the MMO particles may be non-porous. Without being limited by theory, it is believed that hydrocarbons may only interact with the surface of the MMO particles. Thus, the increased surface area provided by the nano-particulate nature of the mixed metal oxide catalyst may help to achieve sufficient reaction rates.

The MMO particles, in the form of a powder, may be combined with binder materials, extrusion additives, or other materials, extruded, and calcined to form the mixed metal oxide catalyst 114 in the form of catalyst pellets. In embodiments, the MMO particles, in powder form, may be combined and mixed with a binder material and methylcellulose to produce a solid mixture.

The binder materials may comprise silica, alumina, silica-alumina, a clay, or any combinations of these. The alumina may comprise an acid peptized alumina. The silica-alumina may comprise an amorphous silica-alumina. Clays may include, but are not limited to, kaolin, montmorilonite, halloysite, bentonite, or combinations of these. In embodiments, the binder material may comprise bentonite, silica, or combinations of these. In embodiments, the mixed metal oxide catalyst 112 may comprise bentonite as the binder. The methylcellulose may be added to the solid mixture to facilitate extrusion, but may be burned off during calcination. Thus, the mixed metal oxide catalyst 112 pellets may comprise, consist of, or consist essentially of the MMO particles and the binder.

The dry ingredients—the MMO particles, binder, and methylcellulose—may be well mixed to produce a solid mixture. In embodiments, the solid mixture may comprise from 50 wt. % to 90 wt. % of the MMO particles based on the total weight of the solid mixture, such as from 50 wt. % to 85 wt. % from 50 wt. % to 80 wt. %, from 60 wt. % to 90 wt. %, from 60 wt. % to 85 wt. %, from 60 wt. % to 80 wt. %, from 65 wt. % to 90 wt. %, from 65 wt. % to 85 wt. %, from 65 wt. % to 80 wt. %, from 70 wt. % to 90 wt. %, from 70 wt. % to 85 wt. %, from 70 wt. % to 80 wt. %, or about 75 wt. % of the MMO particles based on the total weight of the dry solid mixture. In embodiments, the solid mixture may comprise from about 10 wt. % to 50 wt. % of the binder based on the total weight of the dry solid mixture, such as from 10 wt. % to 49.9 wt. %, from 10 wt. % to 40 wt. %, from 10 wt. % to 35 wt. %, from 10 wt. % to 30 wt. %, from 10 wt. % to 25 wt. %, from 15 wt. % to 50 wt. %, from 15 wt. % to 49.9 wt. %, from 15 wt. % to 40 wt. %, from 15 wt. % to 35 wt. %, from 15 wt. % to 30 wt. %, from 15 wt. % to 25 wt. %, 20 wt. % to 50 wt. %, from 20 wt. % to 49.9 wt. %, from 20 wt. % to 40 wt. %, from 20 wt. % to 35 wt. %, from 20 wt. % to 30 wt. %, from 20 wt. % to 25 wt. %, or from 24 wt. % to 25 wt. % of the binder based on the total weight of the dry solid mixture. In embodiments, the solid mixture may comprise from 0.01 wt. % to 2 wt. % methylcellulose, such as from 0.01 wt. % to 1 wt. %, from 0.1 wt. % to 2 wt. %, from 0.1 wt. % to 1 wt. %, or about 0.1 wt. % of the methylcellulose, based on the total weight of the dry solid mixture. In embodiments, the dry mixture may comprise about 75 wt. % of the MMO particles, about 24.9 wt. % of the binder materials, and about 0.1 wt. % of the methyl cellulose based on the total weight of the dry solid mixture.

The dry solid mixture may be mixed thoroughly to produce a homogeneous solid mixture, such as by mixing with a mortar and pestle or using automated mixing equipment, such as but not limited to a V-blender, Schugi mixer, or other powder mixing devices. Following mixing, water may be added to the dry solid mixture form an extrudable paste. In embodiments, from 1 milliliter (ml) to 2 ml, or about 1.5 mL of water per gram of dry material may be added to the dry solid mixture to form the extrudable paste.

The extrudable paste, which comprises the MMO particles, binder, methylcellulose, and water, may then be extruded in an extruder. In embodiments, the extrudable paste may be inserted into the syringe of a syringe pump. Alternatively, other pressurization devices such as peristaltic pumps, screw extruders, twin-screw extruders, or the like, may be used to pressurize the extrudable paste. The pressurized paste may be forced through an extrusion die to form an extrudate comprising extruded strands of the extrudable paste. The extrusion die and resulting extrudate may have a round cross section, or may have any other cross sectional shape, such as star shaped, square shaped, hexagonal shaped, tri-lobe shaped, daisy shaped, cylcut shaped, 7-hole shaped, or donut shaped. In embodiments, the strands of the extrudate may have a cross-sectional diameter of from 1 mm to 3 mm.

Following extrusion, the extrudate may be dried and calcined. The extruded strands of the extrudate may be cut to length to produce catalyst pellets before drying, after drying but before calcination, or after calcination. The extruded strands of the extrudate may be dried before calcination because excessive water in the catalyst particles can result in the buildup of steam pressure and the weakening or breakage of the catalyst pellets during or after calcination. The extruded strands or extrudate pellets may be dried at an elevated temperature. In embodiments, the extruded strands or extrudate pellets may be dried at least 40° C., such as at least 50° C., from 40° C. to 100° C., from 40° C. to 90° C., from 40° C. to 80° C., from 50° C. to 70° C., or any subset thereof. The extruded strands or extruded pellets may be dried at the elevated temperature for at least 6 hours, such as at least 12 hours, at least 18 hours, from 6 hours to 48 hours, from 12 hours to 48 hours, or any subset thereof.

After drying, the dried extrudate (strands or pellets) may then be calcined. In embodiments, the dried extrudate may be calcined at a temperature of at least 400° C., such as at least 500° C., at least 600° C., from 400° C. to 800° C., from 500° C. to 700° C., from 600° C. to 700° C., from 625° C. to 675° C., or any subset thereof. The dried extrudate may be calcined for at least 1 hour, such as at least 1.5 hours, from 1 hour to 5 hours, from 1 hour to 3 hours, from 1.5 hours to 2.5 hours, or any subset thereof. The calcination may be conducted in an oxygen-containing atmosphere, such as but not limited to ambient air (about 20.9% oxygen).

The pellets of the mixed metal oxide catalyst may comprise the MMO particles and the binder. The pellets of the mixed metal oxide catalyst may also include any calcined residue from the methylcellulose. Each of the MMO particles includes $Fe_2O_3$, $ZrO_2$, $CeO_2$, and $Al_2O_3$. In embodiments, the pellets of the mixed metal oxide catalyst may comprise from 65 wt. % to 85 wt. %, from 65 wt. % to 80 wt. %, from 70 wt. % to 85 wt. %, from 70 wt. % to 80 wt. %, from 75 wt. % to 85 wt. %, from 75 wt. % to 80 wt. %, from 80 wt. % to 85 wt. %, or about 75 wt. % of the MMO particles, on the basis of the total weight of the mixed metal oxide catalyst, with the balance being the binder materials and any calcined residues of the methylcellulose. In embodiments, the mixed metal oxide catalyst may comprise from 15 wt. % to 35 wt. %, from 15 wt. % to 30 wt. %, from 15 wt. % to 25 wt. %, from 20 wt. % to 35 wt. %, from 20 wt. % to 30 wt. %, from 20 wt. % to 25 wt. %, from 25 wt. % to 35 wt. %, from 25 wt. % to 30 wt. %, or about 25 wt. % of the binder materials based on the total weight of the mixed metal oxide catalyst. The concentration of methylcellulose residue in the mixed metal oxide catalyst may be less than 0.1 wt. %, less than 0.05 wt, %, or even less than or equal to 0.01 wt. % based on the total weight of the mixed metal oxide catalyst. In embodiments, the pellets of the mixed metal oxide catalyst may comprise at least 80 wt. %, at least 90 wt. %, at least 95 wt. %, at least 99 wt. %, or even at least 99.9 wt. % of $Fe_2O_3$, $ZrO_2$, $CeO_2$, and $Al_2O_3$, and the binder materials, based on the total weight of the mixed metal oxide catalyst. In embodiments, the mixed metal oxide catalyst may comprise 75 wt. % of the MMO particles and 25 wt. % of the binder material.

The pellets of the mixed metal oxide catalyst may have a particles size of greater than or equal to 0.1 mm, greater than or equal to 0.5 mm, greater than or equal to 1 mm, or greater than or equal to 1.5 mm. In embodiments, the pellets of the mixed metal oxide catalyst may have a particle size of from 0.1 mm to 5 mm, such as from 0.1 mm to 3 mm, from 0.1 mm to 2.5 mm, from 0.1 mm to 2.0 mm, from 0.5 mm to 5 mm, such as from 0.5 mm to 3 mm, from 0.5 mm to 2.5 mm, from 0.5 mm to 2.0 mm, from 1 mm to 5 mm, from 1 mm to 3 mm, such as from 1 mm to 2.5 mm, from 1.5 mm to 3 mm, or from 1 mm to 2.5 mm, where the particles size is equal to the largest dimension of the pellet. After calcination, the mixed metal oxide catalyst may be broken up or crushed and then sieved to achieve the particle size within the desired range. In embodiments, the pellets of the mixed metal oxide catalyst may be cylindrical with a pellet diameter and a pellet length. In embodiments, the pellets of the mixed metal oxide catalyst may have a pellet diameter of from 1 mm to 3 mm, such as from 1.5 mm to 3 mm, from 1 mm to 2.5 mm, from 1.5 mm to 2.5 mm, or any subset thereof. In embodiments, the pellet length of the mixed metal oxide catalyst may be from 2 mm to 4 mm.

In embodiments, the mixed metal oxide catalyst may comprise 75 wt. % of the MMO particles and 25 wt. % bentonite and may have an average pore diameter of from 14 nm to 15 nm, or about 14.6 nm, as determined by the BJH method. In embodiments, the mixed metal oxide catalyst may comprise 75 wt. % of the MMO particles and 25 wt. % bentonite and may have a BET surface area of from 40 $m^2$/g to 60 $m^2$/g, from 45 $m^2$/g to 55 $m^2$/g, or about 49.1 $m^2$/g. In embodiments, the mixed metal oxide catalyst may comprise 75 wt. % of the MMO particles and 25 wt. % bentonite and may have a total pore volume of from 0.100 $cm^3$/g to 0.200 $m^3$/g, such as from 0.125 $cm^3$ to 0.175 $cm^3$/g, or about 0.157 $cm^3$/g.

In embodiments, the hydrocracking catalyst 114 may be a supported metal oxide catalyst, which may comprise one or a plurality of metal oxides supported on a catalyst support material. In embodiments, the supported metal oxide catalyst may comprise molybdenum oxide ($MoO_3$) and nickel oxide (NiO) supported on a catalyst support material. The supported metal oxide catalyst may further comprise phosphorous. The supported metal oxide catalyst may further include a binder. The supported metal oxide catalyst may be extruded, broken into pieces, and calcined to produce supported metal oxide catalysts. The metal oxides of the supported metal oxide catalyst may be incorporated into the extrusion batch material or may be impregnated onto the pellets following extrusion and calcining the catalyst support material.

The catalyst support material may comprise a large-pore alumina, such as but not limited to a large-pore Boehmite. The binder may comprise an alumina binder, which may have smaller pore sizes and greater bulk density compared to the large-pore alumina of the catalyst support material. In particular, in embodiments, the large-pore alumina may have a BET surface area of less than or equal to 200 $m^2$/g, such as from 100 $m^2$/g to 200 $m^2$/g. In embodiments, the large-pore alumina may have a total pore volume of greater than 0.8 $cm^3$/g, such as from 0.8 $cm^3$/g to 1.1 $cm^3$/gram. In embodiments, the large-pore alumina may have an average pore radius of greater than or equal to 10 nm, such as from 10 nm to 20 nm, or from 10 nm to 15 nm. The larger pore-size of the large-pore alumina may enable greater diffusion rate of the larger multi-ring aromatic compounds into the pores of the catalyst support material to reach catalytic sites comprising the nickel oxide and molybdenum oxides deposited onto the surfaces of the pores of the catalyst support material. Properties for example embodiments of the large-pore alumina and the alumina binder are provided in Table 2.

TABLE 2

| Properties of Large-Pore Alumina Support Material and Alumina Binder | | |
| --- | --- | --- |
| Property | Large-Pore Alumina Support Material | Alumina Binder |
| Alumina Content (mol. %) | 98 | 72 |
| $Na_2O$ Content (mol. %) | 0.002 | 0.002 |
| Loss on Ignition (%) (method described in Example 1) | 2 | — |
| Loose Bulk Density (grams/liter) | 300-500 | 670-750 |
| Packed Bulk Density (grams/liter) | 700-950 | 800-1100 |
| Average Particle Size (μm) | 40 | 60 |
| Average BET Surface Area ($m^2$/g) | 150 | 250 |
| Pore Volume ($cm^3$/gram) (ASTM 6761) | 0.8-1.1 | 0.5 |
| Average Pore Radius (nm) | 11 | — |

The supported metal oxide catalyst may be produce by a mixing method or by an impregnation method. In the mixing method, a molybdenum oxide precursor, a nickel oxide precursor, the large-pore alumina matrix material, and the alumina binder may be mixed together for form a dry mixture. Water is added to the dry mixture to produce an extrudable paste. The extrudable paste is then extruded as previous discussed in relation to the mixed metal oxide catalyst. The extrudable paste may be extruded to form cylindrical or multi-lobed extrudates. The extrudates may then be dried at 100° C. to 120° C. for a drying period of from 4 hours to 12 hour. The dried extrudates may then be calcined. Calcining the dried extrudates may include ramping the dried extrudates to a calcination temperature of 500° C. at a ramping rate of 2° C./min and then holding at the calcination temperature of 500° C. for at least 4 hours. Calcination may convert the molybdenum oxide precursor to molybdenum oxide ($MoO_3$), and may convert the nickel oxide precursor to nickel oxide (NiO). The calcined catalyst particles may then be cooled back to room temperature to produce the supported metal oxide catalyst.

In embodiments, the supported metal oxide catalyst may be produced by an impregnation method. In the impregnation method, the large-pore alumina and the alumina binder may be combined with water to produce an extrudable paste, which may be extruded, dried, and calcined to produce an alumina catalyst support. The process of producing the alumina catalyst support may be the same as described in the mixing method. Following preparation of the alumina catalyst support, the alumina catalyst support may be impregnated with a solution comprising a molybdenum oxide precursor and a nickel oxide precursor in water. In embodiments, the solution may also include a phosphorous compound, such as but not limited to $H_3PO_4$. The phosphorous compounds may be added to the solution to stabilize the solution of the metal oxide precursors in water, which may improve distribution of the metal oxide precursors throughout the alumina support. In embodiments, the molybdenum oxide precursor may be ammonium heptamolybdate. In embodiments, the nickel oxide precursor may be nickel nitrate or nickel carbonate. Other molybdenum oxide precursors and nickel oxide precursors may be used to similar result. In embodiments, the solution may comprise ammonium heptamolybdate and nickel nitrate in water. In embodiments, the solution may comprise ammonium heptamolybdate, nickel carbonate, and $H_3PO_4$ in water.

After impregnating with the solution comprising the molybdenum oxide precursor and nickel oxide precursor, the impregnated alumina catalyst support may be dried and calcined to produce the supported metal oxide catalyst. The impregnated alumina catalyst support may be dried at a temperature of from 100° C. to 120° C. for a drying period of from 4 hours to 12 hours. Following drying, the dried impregnated alumina catalyst support may be calcined to convert the precursors to the metal oxides. The dried impregnated alumina catalyst support may be ramped up to the calcination temperature of 500° C. at a temperature ramp rate of 2° C./minute and held at the calcination temperature for a calcination period of greater than or equal to 4 hours. The resulting supported metal oxide catalyst may be cooled back to room temperature.

The supported metal oxide catalyst may comprise from 53 wt. % to 68 wt. % of the large-pore alumina, such as a large-pore bochmite, based on the total weight of the supported metal oxide catalyst. In embodiments, the supported metal oxide catalyst may comprise from 53 wt. % to 65 wt. %, from 53 wt. % to 62 wt. % from, 55 wt. % to 68 wt. %, from 55 wt. % to 65 wt. % from 55 wt. % to 62 wt. %, from 58 wt. % to 68 wt. %, from 58 wt. % to 65 wt. %, from 58 wt. % to 62 wt. %, from 60 wt. % to 68 wt. %, or from 60 wt. % to 62 wt. % of the large-pore alumina, based on the total weight of the supported metal oxide catalyst. The supported metal oxide catalyst may comprise from 15 wt. % to 25 wt. % binder, such as but not limited to an alumina binder, based on the total weight of the supported metal oxide catalyst. In embodiments, the supported metal oxide catalyst may comprise from 15 wt. % to 23 wt. %, from 15 wt. % to 20 wt. %, from 18 wt. % to 25 wt. %, from 18 wt. % to 23 wt. %, from 18 wt. % to 20 wt. %, or from 20 wt. % to 25 wt. % of the binder based on the total weight of the supported metal oxide catalyst.

The supported metal oxide catalyst may comprise from 3 wt. % to 7 wt. % nickel oxide based on the total weight of the supported metal oxide catalyst. In embodiments, the supported metal oxide catalyst may comprise from 3 wt. % to 6 wt. %, from 3 wt. % to 5 wt. %, from 4 wt. % to 7 wt. %, from 4 wt. % to 6 wt. %, from 4 wt. % to 5 wt. %, from 5 wt. % to 7 wt. %, from 5 wt. % to 6 wt. %, or from 6 wt. % to 7 wt. % of the nickel oxide based on the total weight of the supported metal oxide catalyst. The supported metal oxide catalyst may comprise from 13 wt. % to 17 wt. % molybdenum oxide based on the total weight of the supported metal oxide catalyst. In embodiments, the supported metal oxide catalyst may comprise from 13 wt. % to 16 wt. %, from 13 wt. % to 15 wt. %, from 14 wt. % to 17 wt. %, from 14 wt. % to 16 wt. %, from 14 wt. % to 15 wt. %, from 15 wt. % to 17 wt. %, from 15 wt. % to 16 wt. %, or from 16 wt. % to 17 wt. % of the molybdenum oxide based on the total weight of the supported metal oxide catalyst. In embodiments, the supported metal oxide catalyst may comprise from 1 wt. % to 8 wt. % phosphorous compounds based on the total weight of the supported metal oxide catalyst, wuch sa from 1 wt. % to 7 wt. %, from 1 wt. % to 6 wt. %, from 1 wt. % to 5 wt. %, from 2 wt. % to 8 wt. %, from 2 wt. % to 7 wt. %, from 2 wt. % to 6 wt. %, from 2 wt. % to 5 wt. %, from 3 wt. % to 8 wt. %, from 3 wt. % to 7 wt. %, from 3 wt. % to 6 wt. %, from 3 wt. % to 5 wt. %, from 5 wt. % to 8 wt. %, from 5 wt. % to 7 wt. %, or from 6 wt. % to 8 wt. % of the phosphorous compounds, based on the total weight of the supported metal oxide catalyst. The phosphorous compounds may be added to stabilize the molybdenum oxide precursor and nickel oxide precursor in the extrusion mixture or in the impregnation solution. The phosphorous compounds may be converted to phosphorous oxide ($P_2O_3$) during the calcination process. The molybdenum oxide and nickel oxide may be present at the outer surfaces and pore surfaces of the supported metal oxide catalyst to provide catalytically active sites at the outer surfaces and pore surfaces of the supported metal oxide catalyst.

The supported metal oxide catalyst may be in the form of pellets suitable for use in a fixed-bed reactor. In embodiments, the pellets of the supported metal oxide catalyst may have a largest dimension that is from 1 mm to 4 mm, from 1 mm to 3 mm, such as from 1 mm to 2.5 mm, from 1.5 mm to 4 mm, from 1.5 mm to 3 mm, or from 1 mm to 2.5 mm. In embodiments, the pellets of the supported metal oxide catalyst may be cylindrical with a pellet diameter and a pellet length. In embodiments, the pellets of the supported metal oxide catalyst may have a pellet diameter of from 1 mm to 3 mm, such as from 1.5 mm to 3 mm, from 1 mm to 2.5 mm, from 1.5 mm to 2.5 mm, or any subset thereof. In embodiments, the pellet length of the supported metal oxide catalyst may be from 1 mm to 4 mm, or from 1 mm to 3 mm.

The supported metal oxide catalyst may have a total pore volume of greater than or equal to 0.40 centimeters cubed per gram ($cm^3/g$), greater than or equal to 0.50 $cm^3/g$, or even greater than or equal to 0.6 $cm^3/g$. In embodiments, the supported metal oxide catalyst may have a total pore volume of from 0.4 $cm^3/g$ to 1.0 $cm^3/g$, from 0.4 $cm^3/g$ to 0.90 $cm^3/g$, from 0.5 $cm^3/g$ to 1.0 $cm^3/g$, from 0.5 $cm^3/g$ to 0.9 $cm^3/g$, from 0.6 $cm^3/g$ to 1.0 $cm^3/g$, or from 0.6 $cm^3/g$ to 0.9 $cm^3/g$. The total pore volume may be determined by mercury porosimetry according to the test methods in ASTM 6761.

The supported metal oxide catalyst may have a BET surface area of from 150 $m^2/g$ to 600 $m^2/g$, such as from 150 $m^2/g$ to 550 $m^2/g$, from 150 $m^2/g$ to 500 $m^2/g$, from 150 $m^2/g$ to 450 $m^2/g$, from 200 $m^2/g$ to 600 $m^2/g$, from 200 $m^2/g$ to 550 $m^2/g$, from 200 $m^2/g$ to 500 $m^2/g$, from 200 $m^2/g$ to 450 $m^2/g$, from 200 $m^2/g$ to 400 $m^2/g$, from 250 $m^2/g$ to 600 $m^2/g$, from 250 $m^2/g$ to 550 $m^2/g$, from 250 $m^2/g$ to 500 $m^2/g$, from 250 $m^2/g$ to 450 $m^2/g$, from 250 $m^2/g$ to 400 $m^2/g$, from 300 $m^2/g$ to 600 $m^2/g$, from 300 $m^2/g$ to 550 $m^2/g$, from 300 $m^2/g$ to 500 $m^2/g$, from 300 $m^2/g$ to 450 $m^2/g$, or from 300 $m^2/g$ to 400 $m^2/g$. The BET surface area is determined through gas porosimetry using the Brunauer-Emmett-Teller (BET) analysis. The supported metal oxide catalyst may have an average pore size of from 10 nanometers (nm) to 30 nm.

Contacting the pyrolysis oil feed 102 with hydrogen 108 in the presence of the hydrocracking catalyst 214 (the mixed metal oxide catalyst or the supported metal oxide catalyst) at the reaction conditions in the fixed-bed reactor 110 may convert at least a portion of the multi-ring aromatic compounds in the pyrolysis oil feed 102 to lighter aromatic compounds in a single step, without conducting a subsequent chemical reaction step. The lighter aromatic compounds may comprise di-aromatic compounds, tri-aromatic compounds, light aromatic compounds having from 6-8 carbon atoms, or combinations of these. Converting at least a portion of the multi-ring aromatic compounds to mono-aromatic compounds, di-aromatic compounds, tri-aromatic compounds, or both, is a complicated reaction scheme comprising multiple synchronized and selective reactions, which may include selective hydrogenation of one aromatic ring in a compound but not all, subsequent ring opening of the saturated tetra-aromatic compounds, hydro-dealkylation, transalkylation, and disproportionation reactions. Not intending to be bound by any particular theory, it is believed that upgrading the pyrolysis oil feed 102 may include selective hydrogenation of at least one aromatic ring structure or a multi-ring aromatic compound to produce a molecule with one or more aromatic rings and at least one saturated ring. The saturated ring portion may then undergo ring opening to produce a substituted aromatic compound. The substituted aromatic may then undergo one or more of hydroalkylation, transalkylation, or disproportionation to produce light aromatic compounds. It is understood that multiple variations and combinations of these reactions as well as other chemical reactions may occur during the upgrading process. This complex sequence of synchronized reactions for upgrading pyrolysis oil feed 102 may be catalyzed using the mixed metal oxide catalyst or the supported metal oxide catalyst as the hydrocracking catalyst 114.

The fixed-bed reactor 110 may contact the pyrolysis oil feed 102 with the hydrogen 108 in the presence of the hydrocracking catalyst (mixed metal oxide catalyst or supported metal oxide catalyst) at mild operating conditions sufficient to cause at least a portion of multi-ring aromatic compounds in the pyrolysis oil feed 102 to be upgraded to produce a reactor effluent 114, where the reactor effluent 118 comprises light aromatic compounds (BTEX), di-aromatic compounds, tri-aromatic compounds, or combinations of these. The fixed-bed reactor 110 may be operated at an operating temperature in the range of from 300° C. to 500° C., such as from 300° C. to 450° C., from 300° C. to 400° C., from 350° C. to 500° C., from 350° C. to 450° C., from 350° C. to 400° C. from 375° C. to 500° C., from 375° C. to 450° C., or from 375° C. to 400° C. The fixed-bed reactor 110 may be operated at an operating pressure of from 1 megapascal (MPa) (10 bar) to 30 MPa (300 bar), such as from 3 MPa (30 bar) to 20 MPa (200 bar), from 5 MPa (50 bar) to 20 MPa (200 bar), from 7 MPa (70 bar) to 20 MPa (200 bar), from 10 MPa (100 bar) to 20 MPa (200 bar), from 1 MPa (10 bar) to 15 MPa (150 bar), from 3 MPa (30 bar) to 15 MPa (150 bar), from 5 MPa (50 bar) to 15 MPa (150 bar), from 7 MPa (70 bar) to 15 MPa (150 bar), or from 10 MPa (100 bar) to 15 MPa (150 bar).

The fixed-bed reactor 110 may be operated with a liquid hourly space velocity (LHSV) of the liquid components through the fixed-bed reactor 110 of from 0.1 per hour ($h^{-1}$) to 1.2 $h^{-1}$, from 0.1 $h^{-1}$ to 1 $h^{-1}$, from 0.1 $h^{-1}$ to 0.8 $h^{-1}$, from 0.1 $h^{-1}$ to 0.6 $h^{-1}$, from 0.2 $h^{-1}$ to 0.4 $h^{-1}$, or any subset thereof. The fixed-bed reactor 110 may be operated with a gas hourly space velocity (GHSV) of the gas components through the fixed-bed reactor 110 of from 200 $h^{-1}$ to 1500 $h^{-1}$, such as from 200 $h^{-1}$ to 1200 $h^{-1}$, from 400 $h^{-1}$ to 1200 $h^{-1}$, from 600 $h^{-1}$ to 1000 $h^{-1}$, from 700 $h^{-1}$ to 900 $h^{-1}$, or any subset thereof. The fixed-bed reactor 110 may be operated at volume ratio of hydrogen 108 to the pyrolysis oil feed 102 of from 500 to 1500, from 500 to 1400, from 500 to 1300, from 500 to 1200, from 800 to 1500, from 800 to 1400, from 800 to 1300, or from 800 to 1200, at the reaction temperature and pressure of the fixed-bed reactor 110.

The reactor effluent 118 may be passed out of the fixed-bed reactor 110. In embodiments, the reactor effluent 118 may be passed out of the fixed-bed reactor 110 through a single outlet in the fixed-bed reactor 110. The reactor effluent 118 may comprise unreacted hydrogen; light hydrocarbon gases, such as C1-C4 hydrocarbon compounds; and reaction products comprising aromatic compounds having boiling point temperatures of from 30° C. to 360° C., such as but not limited to di-aromatic compounds, tri-aromatic compounds, and light aromatic compounds having from 6-8 carbon atoms. The reactor effluent 118 may comprise a concentration of multi-ring aromatic compounds having boiling point temperatures of greater than 360° C. that is less than a concentration of multi-ring aromatic compounds having boiling point temperatures greater than 360° C. in the pyrolysis oil feed 102 and less than a concentration of multi-ring aromatic compounds having boiling point temperatures greater than 360° C. in the heavy pyrolysis oil 104.

The reactor effluent 118 may have concentrations of constituents in the naphtha an diesel boiling point temperature range compared to the pyrolysis oil feed 102, the heavy pyrolysis oil 104, or both. The reactor effluent 118 may have concentrations of sulfur and nitrogen that is less than the concentrations of sulfur and nitrogen in the pyrolysis oil feed 102, heavy pyrolysis oil 104, or both. In embodiments, the reactor effluent 118 may have a concentration of sulfur compounds that is less than 10% by weight of the concentration of sulfur compounds in the pyrolysis oil feed 102, the heavy pyrolysis oil 104, or both. In embodiments, the reactor effluent 118 may have a concentration of nitrogen compounds that is less than 10% by weight of the concentration of nitrogen compounds in the pyrolysis oil feed 102, the heavy oil feed 104, or both.

The single step fixed-bed catalytic process of the present disclosure can selectively hydrotreat and hydrocrack heavy pyrolysis oil streams to reduce sulfur and nitrogen and convert heavy multi-ring aromatic compounds (boiling point temperature greater than 360° C.) to greater value di-aromatic compounds, tri-aromatic compounds, light aromatic compounds (BTEX), or combinations of these, which have boiling point temperatures in the naphtha and diesel boiling point ranges (50° C. to 360° C.). The fixed-bed process herein can attain a total conversion of multi-ring aromatic compounds having boiling point temperatures greater than 360° C. that is greater than or equal to 35%, greater than or equal to 40%, greater than or equal to 50%, greater than or equal to 60%, greater than or equal to 70%, greater than or equal to 80%, greater than or equal to 90%, or even greater than or equal to 93%.

The fixed-bed catalytic process of the present disclosure may convert the multi-ring aromatic compounds having boiling point temperatures greater than 360° C. to di-aromatic, tri-aromatic compounds, and light aromatic compounds without overcracking the aromatic compounds to light hydrocarbon gases. In embodiments, the fixed-bed catalytic process of the present disclosure may produce a yield of light hydrocarbon gases of less than or equal to 2 wt. %, less than or equal to 1.9 wt. %, less than or equal to 1.8 wt. %, less than or equal to 1.7 wt. %, less than or equal to 1.6 wt. %, or even less than or equal to 1.5 wt. % light hydrocarbon gases, where the light hydrocarbon gases comprise hydrocarbons having from 1-4 carbon atoms.

In embodiments, the fixed-bed catalytic process of the present disclosure can remove greater than or equal to 90% of the sulfur compounds from the pyrolysis oil feed 102, such as greater than or equal to 91%, or even greater than or equal to 92% of the sulfur compounds from the pyrolysis oil feed 102. In embodiments, the fixed-bed catalytic process of the present disclosure can remove greater than or equal to 85% of the nitrogen compounds from the pyrolysis oil feed 102, such as greater than or equal to 86%, greater than or equal to 87%, greater than or equal to 88%, or even greater than or equal to 90% of the nitrogen compounds from the pyrolysis oil feed 102.

Referring again to FIG. 1, the outlet of the fixed-bed reactor 110 may be in fluid communication with the reactor effluent separator 120 to pass the reactor effluent 118 from the fixed-bed reactor 110 to the reactor effluent separator 120. The reactor effluent separator 120 may be directly downstream of the fixed-bed reactor 110 so that the reactor effluent 118 can be passed directly from the fixed-bed reactor 110 to the reactor effluent separator 120 without passing through any intervening reactors or unit operations. The reactor effluent separator 120 may include one or a plurality of separators. The reactor effluent separator 120 may be operable to separate the reactor effluent 118 into a light gas stream 122, at least one product stream 124, and a hydrocracking bottom stream 126. The light gas stream 122 may comprise unreacted hydrogen, C1-C4 hydrocarbon compounds, other light gases having boiling point temperatures less than 30° C., or combinations of these. The product streams 124 may include one or more of a naphtha stream comprising boiling point temperatures of from 30° C. to 173° C., a diesel stream having boiling point temperatures of from 173° C. to 360° C., a light aromatic stream comprising aromatic compounds having from 6-8 carbon atoms, a BTEX stream, a benzene stream, a toluene stream, a mixed xylenes stream, or combinations of these. The product streams 124 may be passed to one or more downstream unit operations for further processing or purification.

In embodiments, the hydrocracking bottom stream 126 may include constituents of the reactor effluent 118 having boiling point temperatures greater than or equal to 360° C., which may include unreacted and partially converted multi-ring aromatic compounds. The hydrocracking bottom stream 126 may be passed back to the fixed-bed reactor 110 or combined with the pyrolysis oil feed 102 upstream of the fixed-bed reactor 110. In embodiments, the system 100 may include a bottoms recycle line 130 in fluid communication with the reactor effluent separator 120 and the pyrolysis oil feed 102 to pass the hydrocracking bottom stream 126 from the reactor effluent separator 120 to combination with the pyrolysis oil feed 102. Recycle of the hydrocracking bottom stream 126 back to the fixed-bed reactor 110 may further increase conversion of the heavy multi-ring aromatic compounds to lighter aromatic compounds boiling point temperatures in the naphtha and diesel boiling point range of from 30° C. to 360° C.

The systems 100 disclosed herein can be used in methods for upgrading a pyrolysis oil feed. The method may include combining the heavy pyrolysis oil 104 and the diluent 106 to produce the pyrolysis oil feed 102. The heavy pyrolysis oil 104 may comprise greater than or equal to 30 wt. % multi-ring aromatic compounds having boiling point temperatures greater than or equal to 360° C. The diluent 106 may comprise a benzene, toluene, xylene, a light pyrolysis oil having a density less than 0.98 grams per cubic centimeter, or combinations thereof. The pyrolysis oil feed 102, heavy pyrolysis oil 104, and diluent 106 can have any of the compositions or properties previously discussed in the present disclosure for the pyrolysis oil feed 102, heavy pyrolysis oil 104, and the diluent, respectively. The method may further include passing the pyrolysis oil feed 102 to the fixed bed reactor 110 comprising the hydrocracking catalyst 114 comprising pellets that may have a particle size greater than or equal to 0.1 millimeter. The hydrocracking catalyst may comprise: (1) a mixed metal oxide catalyst comprising a binder and a plurality of mixed metal oxide particles, each of the mixed metal oxide particles comprising iron oxide ($Fe_2O_3$), zirconium oxide ($ZrO_2$), cerium oxide ($CeO_2$), and alumina ($Al_2O_3$); or (2) a supported metal oxide catalyst comprising molybdenum oxide and nickel oxide supported on a catalyst support material comprising a large-pore alumina having a total pore volume of from 0.8 centimeters cubed per gram to 1.1 centimeters cubed per gram. The method may further include contacting the pyrolysis oil feed 102 with the hydrogen 108 in the presence of the hydrocracking catalyst 114 at reaction conditions in the fixed-bed reactor 110, where the contacting the pyrolysis oil feed 102 with the hydrogen 108 in the presence of the hydrocracking catalyst 114 may cause at least a portion of the pyrolysis oil feed 102 to react to form the reactor effluent 118 comprising a concentration of aromatic compounds having boiling point temperatures of from 50° C. to 360° C. greater than the pyrolysis oil feed 102.

In embodiments, the hydrocracking catalyst may be the mixed metal oxide catalyst. The mixed metal oxide catalyst may have any of the compositions or properties previously discussed in the present disclosure for the mixed metal oxide catalyst. In embodiments, the hydrocracking catalyst may be the supported metal oxide catalyst. The supported metal oxide catalyst may have any of the compositions or properties previously discussed in the present disclosure for the supported metal oxide catalyst. The fixed-bed reactor 110 may be operated at any of the operating conditions previously discussed in the present disclosure for the fixed-bed reactor 110.

In embodiments, the methods may include passing the reactor effluent 118 to a reactor effluent separator 120 and separating the reactor effluent 118 in the reactor effluent separator 120 into one or more of the light gas stream 122, the at least one product stream 124, and the hydrocracking bottom stream 126. In embodiments, the methods may include recycling the hydrocracking bottom stream 126 back to the fixed-bed reactor 110 as at least a portion of the pyrolysis oil feed 110.

Referring again to FIG. 3, in embodiments, the methods may include steam cracking a naphtha stream 202 in a steam cracking unit 210 to produce a naphtha steam cracker effluent 212, separating the naphtha steam cracker effluent 212 in a naphtha steam cracker effluent separator 220 to produce one or more product streams 224 and the heavy pyrolysis oil 104, and passing the heavy pyrolysis oil 104 from the naphtha steam cracker effluent separator 120 to the fixed-bed reactor 110 as at least a portion of the pyrolysis oil feed 102. In embodiments, the methods may include steam cracking a hydrocarbon gas 302 in a hydrocarbon gas steam cracking unit 310 to produce a gas steam cracker effluent 312, separating the gas steam cracker effluent 312 in a gas steam cracker effluent separator 320 to produce one or more product streams 324 and the light pyrolysis oil 326, and passing the light pyrolysis oil 326 from the gas steam cracker effluent separator 320 to the fixed-bed reactor 110 as at least a portion of the diluent in the pyrolysis oil feed 102.

EXAMPLES

The various embodiments of the systems and methods of the present disclosure will be further clarified by the following examples. The examples are illustrative in nature, and should not be understood to limit the subject matter of the present disclosure.

Example 1: Mixed Metal Oxide Catalyst

In Example 1, a mixed metal oxide catalyst comprising mixed metal oxide particles (MMO particles) made up of $Fe_2O_3$, $ZrO_2$, $CeO_2$, and $Al_2O_3$ is prepared. To prepare the catalyst particles comprising the $Fe_2O_3$, $ZrO_2$, $CeO_2$, and $Al_2O_3$, 40 grams (g) of iron (III) nitrate nonahydrate (Fe $(NO_3)_3 \cdot 9H_2O$) was dissolved in 800 milliliters (mL) of distilled water to make Solution A. Then, the other metal oxide precursors were added into Solution A. Specifically, 4.906 g of aluminum nitrate nonahydrate ($Al(NO_3)_3 \cdot 9H_2O$), 1.549 g of zirconium (IV) oxynitrate hydrate ($ZrO(NO_3)_2$:3 $H_2O$), and 0.601 g of cerium (III) nitrate hexahydrate ($Ce(NO_3)_3 \cdot 6H_2O$) were added into Solution A to form Solution B. Solution B was then stirred for thirty minutes.

An ammonia solution, Solution C, was prepared by adding 40 mL ammonium hydroxide solution ($NH_4OH$) (28-30 percentages (%) $NH_3$ basis) in 60 mL distilled water. Solution C was added slowly into Solution B to produce Solution D. Solution C was added until the pH value of Solution D reached roughly 7. Solution D was then stirred for another hour. The precipitate was separated from Solution D and dried in an oven overnight (i.e., for about twelve hours). The dried precipitate was then calcined in air at 500° C. for two hours. After calcining, the dried and calcined precipitate was crushed to obtain the catalyst particles comprising the $Fe_2O_3$, $ZrO_2$, $CeO_2$, and $Al_2O_3$, each of which is distributed throughout each of the MMO particles.

The MMO particles are then combined with a binder and methylcellulose and extruded and calcined to produce the mixed metal oxide catalyst in the form of pellets. To make the mixed metal oxide catalyst pellets, the MMO particles were first mixed with the bentonite as the binder and methylcellulose to produce a dry mixture. The bentonite was model number 285234 bentonite obtained from Sigma-Aldrich. The amounts of each of the components in the extrusion mixture per unit weight of the finished mixed metal oxide catalyst are provided in Table 3.

TABLE 3

| Constituent | Amount Per Unit Weight of Mixed Metal Oxide Catalyst |
|---|---|
| MMO particles (LOI weight) | 0.75 |
| Bentonite (LOI weight) | 0.25 |
| Methylcellulose | 0.1* |

*All of the methylcellulose is burned off during calcination of the MMO catalyst after extrusion.

The weights of the MMO particles and bentonite are based on the weight of these constituents after calcination using loss-on-ignition. The loss-on-ignition weight of the constituents were determined by precisely weighing 3 grams of each component into a crucible and recording the mass of each component added. The crucibles were placed into a furnace, and each component was calcined by ramping the components to a temperature of 650° C. at a temperature ramp rate of 2° C./minute, and holding the components at 650° C. for 2 hours. Once calcination was complete, the crucibles were removed from the furnace and allowed to cool in a desiccator to prevent re-adsorption of water or other constituents from the atmosphere. The calcined components were then re-weighed and the mass recorded. The loss-on-ignition weight of each of the components were calculated from the recorded mass after calcination and the recorded mass before the calcination.

After measuring out and combining the MMO particles, bentonite, and methylcellulose, the dry mixture was then ground using a mortar and pestle until the dry mixture was well mixed and the color was uniform. Deionized (DI) water was then added to the dry mixture gradually until an extrudable paste was formed. In general, the amount of DI water was about 1.15 milliliters (mL) water per gram of the mixed metal oxide catalyst. The extrudable paste was then loaded into a syringe and the syringe placed in a syringe pump. The extrudable paste was then extruded at an extrusion rate of 3 mL/min into cylindrical bodies having a diameter of about 2.1 millimeters (mm). The extrudates were dried in an oven at 60° C. for 24 hours. The dried extrudates were then moved to the furnace and calcined at 650° C. for 2 hours. The dried extrudates were ramped to the calcination temperature at a ramping rate of 2° C./min. The calcined extrudates were then cooled back to room temperature and broken into pellets to produce the mixed metal oxide catalyst. The mixed metal oxide catalyst pellets where then sieved to obtain a fraction of the mixed metal oxide catalyst particles having largest overall dimension of from 1 mm to 2 mm. The properties of the mixed metal oxide catalyst pellets of Example 1 are provided in Table 4.

TABLE 4

| Property (units) | Value | Test Method |
|---|---|---|
| Average Pore Diameter (nm) | 14.6 | Barrett-Joyner-Halenda (BJH) Analysis |
| BET surface area (m²/g) | 49.1 | BET Analysis |
| Total Pore Volume (cm²/g) | 0.157 | ASTM D6761 |

Example 2: Ni—Mo Catalyst Preparation

In Example 2, a novel Ni—Mo catalyst was prepared. The Ni—Mo catalyst was prepared by combining molybdenum oxide ($MoO_3$), nickel nitrate, a large-pore boehmite, and a binder. The large-pore boehmite was PURALOX® TH aluminum oxide from Sasol. The large-pore Boehmite had a BET surface area of 150 meters squared per gram (m²/g), a total pore volume of from 0.80-1.0 milliliters per gram (ml/g), and an average pore radius of from 12-17 nm. The binder was CATAPAL® B alumina from Sasol, which had BET surface area of 250 m²/g, and a total pore volume of 0.50 ml/g (0.50 cm³/g). The amounts of each of the constituents of the supported metal oxide catalyst of Example 2 are provided in Table 5.

TABLE 5

| Constituent | Weight Percent (wt %) |
|---|---|
| Molybdenum Oxide ($MoO_3$) | 13-17 |
| Nickel Precursor ($Ni(NO_3)_2 \cdot 6H_2O$) | 3-7 |

TABLE 5-continued

| Constituent | Weight Percent (wt %) |
|---|---|
| Phosphorous Pentoxide | 1-8 |
| Binder (CATAPAL B, Sasol Lot# P19463) | 53-68 |
| Large pore alumina (Puralox TH 100/150) | 15-25 |

After measuring out and combining the constituents of the Ni—Mo catalyst, the dry mixture was then ground using a mortar and pestle until the dry mixture was well mixed and the color was uniform. Deionized (DI) water was then added to the dry mixture gradually until an extrudable paste was formed. In general, the amount of DI water was about 1.15 milliliters (mL) water per gram of the Ni—Mo catalyst. The extrudable paste was then loaded into a syringe and the syringe placed in a syringe pump. The extrudable paste was then extruded at an extrusion rate of 3 mL/min into extrudates comprising cylindrical bodies having a diameter of about 2.1 millimeters (mm). The extrudates were dried in an oven at a temperature of from 100° C. to 120° C. for a drying period of from 4-12 hours. The dried extrudates were then moved to the furnace and calcined at 500° C. for 4 hours. The dried extrudates were ramped to the calcination temperature at a ramping rate of 2° C./min. The calcined extrudates were then cooled back to room temperature and broken into pellets to produce the Ni—Mo catalyst of Example 2. The Ni—Mo catalyst particles where then sieved to obtain a fraction of the Ni—Mo catalyst particles having largest overall dimension of from 1 mm to 2 mm.

Comparative Examples 3-7: Commercial Catalysts

In Comparative Examples 3-7, commercially available catalysts were provide for comparison to the catalysts or Examples 1 and 2. The commercially-available catalysts of Comparative Examples 3-7 all comprise nickel oxide and molybdenum oxide impregnated on a support comprising alumina, amorphous silica-alumina with an Si/Al ratio of from 1 to 3, or a combination of the two. The nickel oxide content is greater than 3 wt. % and the molybdenum oxide content is greater than 13 wt. % based on the total weight of the commercially-available catalyst. Promoters, such as phosphor or boron, can be added, to improve the dispersion and optimize the metal-support interaction for better performance. The compositions for the commercially-available catalysts of Comparative Examples 3-7 are provided in Table 6.

TABLE 6

| Commercial Catalyst | Com-1 | Com-2 | Com-3 | Com-4 | Com-5 |
|---|---|---|---|---|---|
| Support | Amorphous silica-alumina | Amorphous silica-alumina | Gamma alumina | Amorphous silica-alumina | Amorphous silica-alumina |
| NiO (wt. %) | 3-8 | 3-8 | 2-6 | 10.5-11.5 | 3-5 |
| MoO₃ (wt. %) | 15-25 | — | 15-25 | — | 15-25 |
| WO₃ (wt. %) | — | 15-25 | — | 18.5-21.5 | — |
| P (wt. %) | — | — | 2-4 | — | — |
| ZrO₂ (wt. %) | — | — | — | 9.2-10.2 | — |
| TiO₂ (wt. %) | — | — | — | — | 3-8 |

* The weight percentages of constituents in each commercially-available catalyst are the values provided by the suppliers of the commercially-available catalysts.

Example 8: Upgrading Pyrolysis Oil By One Step Fixed Bed Catalytic Process

In Example 8, the catalysts of Examples 1 and 2 and the commercially-available catalysts of Examples 3-7 were used to upgrade a mixed pyrolysis oil stream in a fixed bed catalytic reactor. For Example 8, the pyrolysis oil feed was a mixture of 80 wt. % of the heavy pyrolysis oil from Table 1 and 20 wt. % of the light pyrolysis oil from Table 1. Properties of the pyrolysis oil feed are provided in the fourth column of Table 1, which provides the properties for the 80/20 by weight mixture of the heavy pyrolysis oil and light pyrolysis oil.

The experiments of Example 8 were conducted in a continuous flow fixed-bed reactor system. The fixed-bed reactor system was a trickle-bed laboratory test unit having 8 parallel reactors capable of testing 8 catalysts simultaneously at the same operating conditions of temperature pressure and flow rate. A syringe pump was used to deliver the pyrolysis oil feed to each of the 8 parallel reactor chambers. For each experiment of Example 8, the catalyst was loaded into the fixed catalyst bed of the fixed-bed reactor. An amount of about 4 ml of each catalyst was charged to each of the fixed-bed reactor chambers. Each catalyst was then subjected to activation and pretreatment prior to introducing the pyrolysis oil feed. The activation and pretreatment process steps and conditions for each step are provided below in Table 7.

TABLE 7

| Step | Step Description | Duration (hr) | Temp. (° C.) | Pressure (kPa) | Ramp Rate (° C./hr) | LHSV (h⁻¹) | Feed | H2 GHSV (h⁻¹) |
|---|---|---|---|---|---|---|---|---|
| 0 | Leak Check | — | RT* | 16,000 | — | — | — | — |
| 1 | Reduce Pressure | — | RT | 15,000 | 5 bar/hr | — | — | — |
| 2 | Increase Temperature | 1.8 | 85 | 15,000 | 25 | — | — | 50 |
| 3 | Increase Temperature | 1.75 | 120 | 15,000 | 20 | — | — | 50 |
| 4 | Temperature Hold | 4 | 120 | 15,000 | — | — | — | 50 |
| 5 | Pre-Wet Catalyst | 3 | 120 | 15,000 | — | 2 | 2 wt. % DMDS in AGO** | 50 |
| 6 | Increase Temperature and GHSV | 5.5 | 230 | 15,000 | 20 | 2 | 2 wt. % DMDS in AGO | 800 |
| 7 | Temperature Hold | 4 | 230 | 15,000 | — | 2 | 2 wt. % DMDS in AGO | 800 |

TABLE 7-continued

| Step | Step Description | Duration (hr) | Temp. (° C.) | Pressure (kPa) | Ramp Rate (° C./hr) | LHSV (h⁻¹) | Feed | H2 GHSV (h⁻¹) |
|---|---|---|---|---|---|---|---|---|
| 8 | Increase Temperature | 6 | 350 | 15,000 | 20 | 2 | 2 wt. % DMDS in AGO | 800 |
| 9 | Temperature Hold | 8 | 350 | 15,000 | — | 2 | 2 wt. % DMDS in AGO | 800 |
| 10 | Ramp Down Temperature | 4 | 230 | 150 | −30 | 2 | 2 wt. % DMDS in AGO | 800 |
| 11 | Switch Feed | — | 230 | 150 | — | 0.3 | Pyrolysis Oil Feed | 800 |

*RT stands for room temperature.
**AGO is a straight run diesel

Following activation and pretreatment of the catalyst, the feed was switched over to the pyrolysis oil feed. The pyrolysis oil feed comprising the 80/20 mixture was introduced into the reactor by using a syringe pump. Hydrogen (H₂) was introduced into the reactor together with the pyrolysis oil feed. The liquid pyrolysis oil feed was passed through a heat exchanger to heat the liquid pyrolysis oil feed before passing the pyrolysis oil feed to the fixed-bed reactor. For each experiment of Example 8, the pyrolysis oil feed was contacted with the catalyst at a reaction temperature of 390° C. and a pressure of 15,000 kPa (150 bar, where 1 bar=100 kPa) gauge pressure. The hydrogen was introduced at a GHSV of 800 h⁻¹, and the pyrolysis oil feed was introduced to the fixed-bed reactor at an LHSV of 0.3 h⁻¹.

The reactor effluent passed out of the fixed-bed reactor was sent to a gas/liquid separated, which separated the reactor effluent into a liquid product stream and a gaseous product stream. The gaseous product stream was analyzed by an online gas chromatography system with both FID and TCD detectors. The liquid product stream was analyzed according to the offline analytical test methods and using the analytical instruments provided in Table 8.

TABLE 8

| Analysis Type | Analytical Instrument | Method |
|---|---|---|
| API Density (15°) | Density Meter DMA 4100 M from Anton Paar | N 12185/ASTM D4052, D5002 (Utube oscillation) |
| Sulfur/ Nitrogen | Mitsubishi; Antek, Analytik Jena | ASTM D4629 |

TABLE 8-continued

| Analysis Type | Analytical Instrument | Method |
|---|---|---|
| Simulated Distillation | Agilent 7890 gas chromatograph | EN 15199-2 |
| Viscosity | Stabinger Viscometer | ASTM D7042 Dyn. Viscosity and Density of Liquids by Stabinger Viscometer |

For the simulated distillation, the analysis was conducted for four distillation fractions: (1) light hydrocarbon gases having 1-4 carbon atoms; (2) a naphtha fraction having a boiling point range of from C5 (boiling point temperature>30° C.) to 173° C.; (3) a diesel fraction having boiling point range of from 173° C. to 360° C.; and (4) a heavy fraction having boiling point temperatures greater than 360° C. The target compounds produced from the fixed-bed catalytic cracking process were in the naphtha fraction and the diesel fraction. The conversion of the 360+° C. boiling point aromatic compounds and yields of light hydrocarbon gases, naphtha fraction, diesel fraction, and remaining unconverted 360+° C. fraction were calculated from a mass balance based on the composition of the pyrolysis oil feed, the analysis of the gaseous product stream, and the analysis of the liquid product stream.

Figure 4:
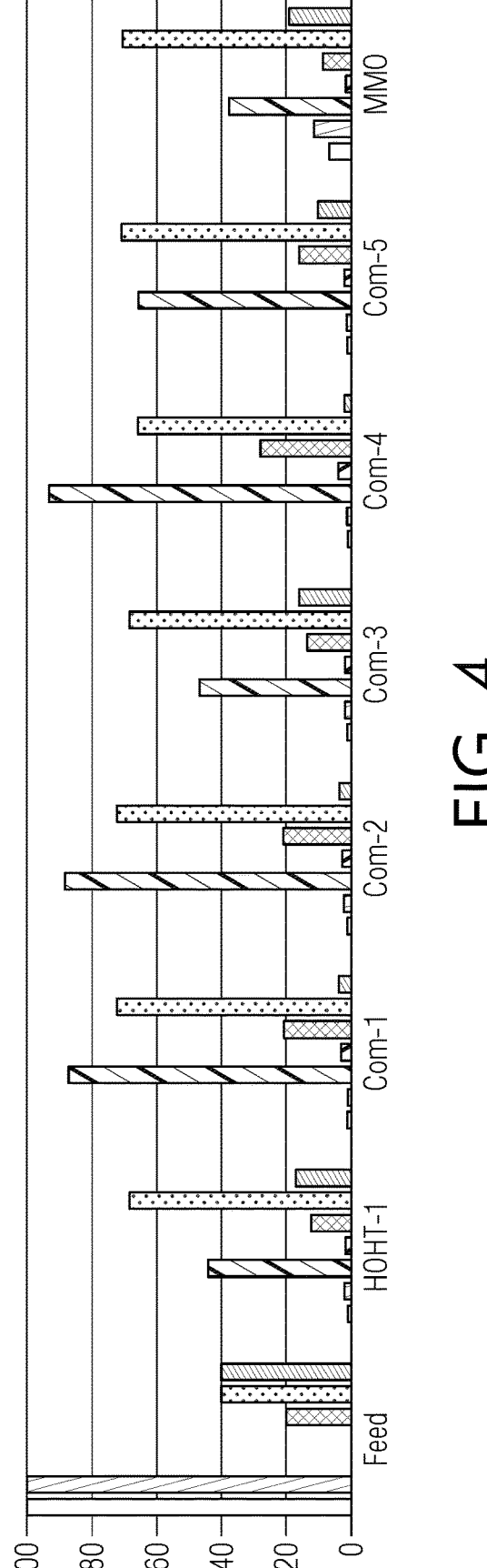
FIG. 4 graphically depicts yields and characteristics for reaction effluents produced by the fixed-bed catalytic processes, according to one or more embodiments shown and described in this disclosure.

Referring now to FIG. 4, the conversion of the 360+° C. boiling point aromatic compounds and yields of light hydrocarbon gases, naphtha fractions, diesel fractions, and remaining unconverted 360+° C. fractions produced in Example 8 are provided. The values are provided in Table 9.

TABLE 9

| Catalyst | Sulfur (ppm) | Nitrogen (ppm) | 360+ ° C. Conversion (%) | Gas Yield (%) | Naphtha Yield (%) | Diesel Yield (%) | Unreacted 360+ ° C. Yield (%) |
|---|---|---|---|---|---|---|---|
| Pyrolysis Oil Feed | 420.62 | 17.13 | 0 | 0 | 20 | 40 | 40 |
| Ex. 1 | 29.23 | 1.96 | 38.11 | 1.30 | 8.71 | 70.72 | 19.27 |
| Ex. 2 | 0.56 | 0.38 | 44.36 | 1.62 | 12.61 | 68.63 | 17.13 |
| CE-3 | 1.03 | 0.15 | 87.07 | 3.09 | 20.45 | 72.47 | 3.99 |
| CE-4 | 1.63 | 0.35 | 88.36 | 2.91 | 20.86 | 72.64 | 3.58 |
| CE-5 | 0.86 | 0.33 | 46.72 | 1.65 | 13.66 | 68.43 | 16.27 |
| CE-6 | 0.80 | 0.05 | 93.59 | 4.08 | 27.81 | 66.15 | 1.96 |
| CE-7 | 0.80 | 0.18 | 65.61 | 2.29 | 16.18 | 71.01 | 10.53 |

As shown in FIG. 4 and Table 9, the catalyst of Example 2 and the commercially-available catalysts of Comparative Examples 3-7 are capable of removing nearly 99% of the sulfur and 95% of the nitrogen from the pyrolysis oil feed. The catalyst of Example 1 is not specifically designed for hydrotreating in a fixed bed reactor to remove sulfur and nitrogen compounds from hydrocarbon feeds. However, the catalyst of Example 1 was still effective in removing nearly 92% of the sulfur and 87% of the nitrogen from the pyrolysis oil feed, indicating good effectiveness of the catalyst for Example 1 for hydrotreating to remove sulfur and nitrogen. Further, the catalyst of Example 1 produce the least amount of light hydrocarbon gases (gas yield) and produced a high yield of the diesel fraction. Thus, the catalyst of Example 1 exhibited good performance in hydrocracking the pyrolysis oil feed into mono-aromatic & di-aromatic intermediate products (diesel range), while minimizing overcracking of the aromatic compounds into light hydrocarbon gases.

A first aspect of the present disclosure may be directed to a method for upgrading pyrolysis oil. The method may include combining a heavy pyrolysis oil and a diluent to produce a pyrolysis oil feed. The heavy pyrolysis oil may comprise greater than or equal to 30 wt. % multi-ring aromatic compounds having boiling point temperatures greater than or equal to 360° C., and the diluent may comprise a benzene, toluene, xylene, a light pyrolysis oil having a density less than 0.98 grams per cubic centimeter, or combinations thereof. The method may further comprise passing the pyrolysis oil feed to a fixed bed reactor comprising a hydrocracking catalyst comprising pellets having a particle size greater than or equal to 0.1 millimeter. The hydrocracking catalyst may comprises a mixed metal oxide catalyst that may comprise a binder and a plurality of mixed metal oxide particles, where each of the mixed metal oxide particles may comprise iron oxide ($Fe_2O_3$), zirconium oxide ($ZrO_2$), cerium oxide ($CeO_2$), and alumina ($Al_2O_3$). Additionally or alternatively, the hydrocracking catalyst may comprise a supported metal oxide catalyst that may comprise molybdenum oxide and nickel oxide supported on a catalyst support material comprising a large-pore alumina having a total pore volume of from 0.8 centimeters cubed per gram to 1.1 centimeters cubed per gram. The method may further include contacting the pyrolysis oil feed with the hydrogen in the presence of the hydrocracking catalyst at reaction conditions in the fixed bed reactor. Contacting the pyrolysis oil feed with hydrogen in the presence of the hydrocracking catalyst may cause at least a portion of the pyrolysis oil to react to form a reaction effluent comprising a concentration of aromatic compounds having boiling point temperatures of from 50° C. to 360° C. greater than the pyrolysis oil feed.

A second aspect of the present disclosure may include the first aspect, where the hydrocracking catalyst may comprise the mixed metal oxide catalyst comprising the binder and the plurality of mixed metal oxide particles.

A third aspect of the present disclosure may include the second aspect, where the mixed metal oxide catalyst may comprise from 50 wt. % to 90 wt. % of the mixed metal oxide particles and from 10 wt. % to wt. % of the binder based on the total weight of the mixed metal oxide catalyst.

A fourth aspect of the present disclosure may include either one of the second or third aspects, where each of the mixed metal oxide particles may comprise from 60 wt. % to 95 wt. % iron oxide, from 1 wt. % to 20 wt. % zirconium oxide, from 0.1 wt. % to 10 wt. % cerium oxide, and from 1 wt. % to 20 wt. % alumina based on the total weight of the mixed metal oxide particles.

A fifth aspect of the present disclosure may include any one of the second through fourth aspects, where each of the mixed metal oxide particles may comprise 83 wt. % iron oxide, 7.5 wt. % zirconium oxide, 2.5 wt. % cerium oxide, and 7.0 wt. % aluminum oxide, based on the total weight of the mixed metal oxide particles.

A sixth aspect of the present disclosure may include any one of the second through fifth aspects, where the mixed metal oxide particles may comprise nanoparticles having a particle size of from 20 nanometers to 200 nanometers.

A seventh aspect of the present disclosure may include any one of the second through sixth aspects, where the binder may be bentonite.

An eighth aspect of the present disclosure may include any one of the second through seventh aspects, where the mixed metal oxide catalyst may have a total pore volume of 0.157 $cm^3$/g.

A ninth aspect of the present disclosure may include any one of the second through eighth aspects, where the mixed metal oxide catalyst has a BET surface area of 49.1 $m^2$/g.

A tenth aspect of the present disclosure may include any one of the second through ninth aspects, where the mixed metal oxide catalyst may have an average pore size of 14.6 nm as determined according to the BJH method.

An eleventh aspect of the present disclosure may include the first aspect, where the hydrocracking catalyst may comprise the supported metal oxide catalyst.

A twelfth aspect of the present disclosure may include the eleventh aspect, where the supported metal oxide catalyst may comprise from 3 wt. % to 7 wt. % nickel oxide and from 13 wt. % to 17 wt. % molybdenum oxide based on the total weight of the supported metal oxide catalyst.

A thirteenth aspect of the present disclosure may include either one of the eleventh or twelfth aspects, where the supported metal oxide catalyst may comprise from 1 wt. % to 8 wt. % phosphorous compounds based on the total weight of the supported metal oxide catalyst.

A fourteenth aspect of the present disclosure may include any one of the eleventh through thirteenth aspects, where the catalyst support material further may comprise a binder.

A fifteenth aspect of the present disclosure may include any one of the eleventh through fourteenth aspects, where the catalyst support material may comprise from 53 wt. % to 68 wt. % of the large pore alumina and from 15 wt. % to 25 wt. % of a binder, based on the total weight of the catalyst support material.

A sixteenth aspect of the present disclosure may include any one of the eleventh through fifteenth aspects, where the large pore alumina may comprise boehmite.

A seventeenth aspect of the present disclosure may include any one of the eleventh through sixteenth aspects, where the large pore alumina may have a BET surface area less than 200 meters squared per gram.

An eighteenth aspect of the present disclosure may include any one of the eleventh through seventeenth aspects, where the large pore alumina may have an average pore radius of greater than or equal to 10 nanometers.

A nineteenth aspect of the present disclosure may include any one of the first through eighteenth aspects, where the pyrolysis oil feed may comprise from 75 wt. % to 85 wt. % of the heavy pyrolysis oil 104 and from 15 wt. % to 25 wt. % of the light pyrolysis oil as the diluent 106, based on the total weight of the pyrolysis oil feed.

A twentieth aspect of the present disclosure may include any one of the first through nineteenth aspects, where the pyrolysis oil feed may have a density at 15° C. of from 0.98 $g/cm^3$ to 1.03 $g/cm^3$.

A twenty-first aspect of the present disclosure may include any one of the first through twentieth aspects, where the pyrolysis oil feed may have a dynamic viscosity at 60° C. of from 5 mPa*s to 10 mPa*s or a kinematic viscosity at 60° C. of from 5 mm²/s to 10 mm²/s.

A twenty-second aspect of the present disclosure may include any one of the first through twenty-first aspects, where the pyrolysis oil feed may have an initial boiling point temperature (IBP) of from 120° C. to 150° C.

A twenty-third aspect of the present disclosure may include any one of the first through twenty-second aspects, where the pyrolysis oil feed may have a final boiling point temperature (FBP) of greater than or equal to 500° C.

A twenty-fourth aspect of the present disclosure may include any one of the first through twenty-third aspects, where the pyrolysis oil feed may have a 50% boiling point temperature of from 200° C. to 300° C.

A twenty-fifth aspect of the present disclosure may include any one of the first through twenty-fourth aspects, where the heavy pyrolysis oil may have one or more of the following properties: a density at 15° C. of from 1.00 g/cm³; a dynamic viscosity at 60° C. that is greater than or equal to 10 millipascal seconds (mPa*s); a kinematic viscosity at 60° C. that is greater than or equal to 10 square millimeters per second (mm²/s); an initial boiling point temperature (IBP) of from 150° C. to 200° C.; a final boiling point temperature (FBP) of greater than or equal to 500° C.; a 50% boiling point temperature of from 300° C. to 500° C.; or any combination of these properties.

A twenty-sixth aspect of the present disclosure may include any one of the first through twenty-fifth aspects, where the diluent comprises the light pyrolysis oil.

A twenty-seventh aspect of the present disclosure may include twenty-sixth aspect, where the light pyrolysis oil may have one or more of the following properties: a density at 15° C. of from 0.92 g/cm³ to 0.98 g/cm³; a dynamic viscosity at 60° C. that is less than or equal to 5 millipascal seconds (mPa*s); a kinematic viscosity at 60° C. that is less than or equal to 5 square millimeters per second (mm²/s); an initial boiling point temperature (IBP) of less than or equal to 120° C.; a final boiling point temperature (FBP) of from 250° C. to 500° C.; a 50% boiling point temperature of from 150° C. to 230° C.; or any combination of these properties.

A twenty-eighth aspect of the present disclosure may include any one of the first through twenty-seventh aspects, where the pyrolysis oil feed may comprise a heavy pyrolysis oil from a naphtha steam cracking system and the diluent comprises the light pyrolysis oil from a gas steam cracking system.

A twenty-ninth aspect of the present disclosure may include any one of the first through twenty-eighth aspects, further comprising: steam cracking a naphtha stream in a steam cracking unit to produce a naphtha steam cracker effluent; separating the naphtha steam cracker effluent in a naphtha steam cracker effluent separator to produce one or more product streams and the heavy pyrolysis oil; and passing the heavy pyrolysis oil from the naphtha steam cracker effluent separator to the fixed-bed reactor as at least a portion of the pyrolysis oil feed.

A thirtieth aspect of the present disclosure may include any one of the first through twenty-ninth aspects, further comprising: steam cracking a hydrocarbon gas in a hydrocarbon gas steam cracking unit to produce a gas steam cracker effluent; separating the gas steam cracker effluent in a gas steam cracker effluent separator to produce one or more product streams and the light pyrolysis oil; and passing the light pyrolysis oil from the gas steam cracker effluent separator to the fixed-bed reactor as at least a portion of the pyrolysis oil feed.

A thirty-first aspect of the present disclosure may include any one of the first through thirtieth aspects, where the contacting may comprise contacting the pyrolysis oil feed with the hydrogen in the presence of the hydrocracking catalyst in the fixed-bed reactor at a temperature of from 300° C. to 500° C., a pressure of from 1 MPa to 20 MPa, a gas hourly space velocity of from 200 h⁻¹ to 1500 h⁻¹, and a liquid hourly space velocity of 0.1 h⁻¹ to 1.2 h⁻¹.

A thirty-second aspect of the present disclosure may be directed to a system for upgrading a pyrolysis oil feed, the system comprising a pyrolysis oil feed stream that may comprise a heavy pyrolysis oil having greater than or equal to 30 wt. % multi-ring aromatic compounds having boiling point temperatures greater than or equal to 360° C. and a diluent comprising benzene, toluene, xylene, a light pyrolysis oil having a density less than 0.98 grams per cubic centimeter, or combinations thereof. The system may further include a fixed-bed reactor comprising a hydrocracking catalyst. The hydrocracking catalyst may comprise: (1) a mixed metal oxide catalyst that may include a binder and a plurality of mixed metal oxide particles, each of the mixed metal oxide particles comprising iron oxide (Fe₂O₃), zirconium oxide (ZrO₂), cerium oxide (CeO₂), and alumina (Al₂O₃); or (2) a supported metal oxide catalyst that may comprise molybdenum oxide and nickel oxide supported on a catalyst support material comprising a large-pore alumina having a total pore volume of from 0.8 centimeters cubed per gram to 1.1 centimeters cubed per gram. The fixed-bed reactor may be operable to contact the pyrolysis oil feed with hydrogen in the presence of the hydrocracking catalyst to produce a reactor effluent comprising a greater concentration of aromatic compounds having boiling point temperatures of from 50° C. to 360° C. compared to the pyrolysis oil feed.

A thirty-third aspect of the present disclosure may include the thirty second aspect, further comprising a naphtha steam cracking system upstream of the fixed-fixed bed reactor. The naphtha steam cracking system may comprise a naphtha steam cracking unit operable to steam crack a naphtha stream to produce a naphtha steam cracker effluent and a naphtha steam cracker effluent separator operable to separate the naphtha steam cracker effluent to produce one or more steam cracking product streams and the heavy pyrolysis oil.

A thirty-fourth aspect of the present disclosure may include the thirty-third aspect, where the naphtha steam cracker effluent separator may be fluidly coupled to an inlet of the fixed-bed reactor to pass the heavy pyrolysis oil directly to the fixed-bed reactor as at least a portion of the pyrolysis oil feed.

A thirty-fifth aspect of the present disclosure may include any one of the thirty-second through thirty-fourth aspects, further comprising a hydrocarbon gas steam cracking system upstream of the fixed-fixed bed reactor. The hydrocarbon gas steam cracking system may comprise a gas steam cracking unit operable to steam crack a hydrocarbon gas to produce a gas steam cracker effluent and a gas steam cracker effluent separator operable to separate the gas steam cracker effluent to produce one or more steam cracking product streams and a light pyrolysis oil.

A thirty-sixth aspect of the present disclosure may include the thirty-fifth aspect, where the gas steam cracker effluent separator may be fluidly coupled to an inlet of the fixed-bed reactor to pass the light pyrolysis oil directly to the fixed-bed reactor as at least a portion of the diluent in the pyrolysis oil feed.

A thirty-seventh aspect of the present disclosure may include any one of the thirty-second through thirty-sixth aspects, where the hydrocracking catalyst may comprise the mixed metal oxide catalyst comprising the binder and the plurality of mixed metal oxide particles.

A thirty-eighth aspect of the present disclosure may include the thirty-seventh aspect, where the mixed metal oxide catalyst may comprise from 50 wt. % to 90 wt. % of the mixed metal oxide particles and from 10 wt. % to wt. % of the binder based on the total weight of the mixed metal oxide catalyst.

A thirty-ninth aspect of the present disclosure may include either one of the thirty-seventh or thirty-eighth aspects, where each of the mixed metal oxide particles may comprise from 60 wt. % to 95 wt. % iron oxide, from 1 wt. % to 20 wt. % zirconium oxide, from 0.1 wt. % to 10 wt. % cerium oxide, and from 1 wt. % to 20 wt. % alumina based on the total weight of the mixed metal oxide particles.

A fortieth aspect of the present disclosure may include the thirty-ninth aspect, where each of the mixed metal oxide particles may comprise 83 wt. % iron oxide, 7.5 wt. % zirconium oxide, 2.5 wt. % cerium oxide, and 7.0 wt. % aluminum oxide, based on the total weight of the mixed metal oxide particles.

A forty-first aspect of the present disclosure may include any one of the thirty-seventh through fortieth aspects, where the mixed metal oxide particles may comprise nanoparticles having a particle size of from 20 nanometers to 200 nanometers.

A forty-second aspect of the present disclosure may include any one of the thirty-seventh through forty-first aspects, where the binder may comprise bentonite.

A forty-third aspect of the present disclosure may include any one of the thirty-second through forty-second aspects, where the hydrocracking catalyst may comprise the supported metal oxide catalyst.

A forty-fourth aspect of the present disclosure may include the forty-third aspect, where the supported metal oxide catalyst may comprise from 3 wt. % to 7 wt. % nickel oxide and from 13 wt. % to 17 wt. % molybdenum oxide based on the total weight of the supported metal oxide catalyst.

A forty-fifth aspect of the present disclosure may include either one of the forty-third or forty-fourth aspects, where the supported metal oxide catalyst may comprise from 1 wt. % to 8 wt. % phosphorous compounds based on the total weight of the supported metal oxide catalyst.

A forty-sixth aspect of the present disclosure may include any one of the forty-third through forty-fifth aspects, where the catalyst support material further may comprise a binder.

A forty-seventh aspect of the present disclosure may include any one of the forty-third through forty-sixth aspects, where the catalyst support material may comprise from 53 wt. % to 68 wt. % of the large pore alumina and from 15 wt. % to 25 wt. % of a binder, based on the total weight of the catalyst support material.

A forty-eighth aspect of the present disclosure may include any one of the forty-third through forty-seventh aspects, where the large pore alumina may comprise boehmite.

A forty-ninth aspect of the present disclosure may include any one of the forty-third through forty-eighth aspects, where the large pore alumina may have a BET surface area less than 200 meters squared per gram.

A fiftieth aspect of the present disclosure may include any one of the forty-third through forty-ninth aspects, where the large pore alumina may have an average pore radius of greater than or equal to 10 nanometers.

A fifty-first aspect of the present disclosure may include any one of the thirty-second through fiftieth aspects, where the pyrolysis oil feed may comprise from 75 wt. % to 85 wt. % of the heavy pyrolysis oil 104 and from 15 wt. % to 25 wt. % of the light pyrolysis oil as the diluent 106, based on the total weight of the pyrolysis oil feed.

A fifty-second aspect of the present disclosure may include any one of the thirty-second through fifty-first aspects, where the pyrolysis oil feed may have a density at 15° C. of from 0.98 g/cm$^3$ to 1.03 g/cm$^3$.

A fifty-third aspect of the present disclosure may include any one of the thirty-second through fifty-second aspects, where the pyrolysis oil feed may have a dynamic viscosity at 60° C. of from 5 mPa*s to 10 mPa*s or a kinematic viscosity at 60° C. of from 5 mm$^2$/s to 10 mm$^2$/s.

A fifty-fourth aspect of the present disclosure may include any one of the thirty-second through fifty-third aspects, where the pyrolysis oil feed may have an initial boiling point temperature (IBP) of from 120° C. to 150° C.

A fifty-fifth aspect of the present disclosure may include any one of the thirty-second through fifty-fourth aspects, where the pyrolysis oil feed may have a final boiling point temperature (FBP) of greater than or equal to 500° C.

A fifty-sixth aspect of the present disclosure may include any one of the thirty-second through fifty-fifth aspects, where the pyrolysis oil feed may have a 50% boiling point temperature of from 200° C. to 300° C.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A method for upgrading pyrolysis oil, the method comprising:

combining a heavy pyrolysis oil and a diluent to produce a pyrolysis oil feed, wherein:

the heavy pyrolysis oil comprises greater than or equal to 30 wt. % multi-ring aromatic compounds having boiling point temperatures greater than or equal to 360° C.; and the diluent comprises a light pyrolysis oil having a density less than 0.98 grams per cubic centimeter;

passing the pyrolysis oil feed to a fixed bed reactor comprising a hydrocracking catalyst comprising pellets having a particle size greater than or equal to 0.1 millimeter, wherein the hydrocracking catalyst comprises:

a supported metal oxide catalyst comprising molybdenum oxide and nickel oxide supported on a catalyst support material comprising a large-pore alumina having a total pore volume of from 0.8 centimeters cubed per gram to 1.1 centimeters cubed per gram; and contacting the pyrolysis oil feed with the hydrogen in the presence of the hydrocracking catalyst at reaction conditions in the fixed bed reactor, wherein the contacting the pyrolysis oil feed with hydrogen in the presence of the hydrocracking catalyst causes at least a portion of the pyrolysis oil to react to form a reaction effluent comprising a concentration of aromatic compounds having boiling point temperatures of from 50° C. to 360° C. greater than the pyrolysis oil feed.

2. The method of claim 1, wherein the supported metal oxide catalyst comprises from 3 wt. % to 7 wt. % nickel oxide and from 13 wt. % to 17 wt. % molybdenum oxide based on the total weight of the supported metal oxide catalyst.

3. The method of claim 1, wherein the supported metal oxide catalyst comprises from 1 wt. % to 8 wt. % phosphorus compounds based on the total weight of the supported metal oxide catalyst.

4. The method of claim 1, wherein the catalyst support material comprises from 53 wt. % to 68 wt. % of the large pore alumina and from 15 wt. % to 25 wt. % of a binder, based on the total weight of the catalyst support material.

5. The method of claim 1, wherein the large pore alumina has a BET surface area less than 200 meters squared per gram, an average pore radius of greater than or equal to 10 nanometers, or both.

6. The method of claim 1, wherein the pyrolysis oil feed comprises from 75 wt. % to 85 wt. % of the heavy pyrolysis oil and from 15 wt. % to 25 wt. % of the light pyrolysis oil as the diluent, based on the total weight of the pyrolysis oil feed.

7. The method of claim 1, further comprising:

steam cracking a naphtha stream in a steam cracking unit to produce a naphtha steam cracker effluent;

separating the naphtha steam cracker effluent in a naphtha steam cracker effluent separator to produce one or more product streams and the heavy pyrolysis oil; and passing the heavy pyrolysis oil from the naphtha steam cracker effluent separator to the fixed-bed reactor as at least a portion of the pyrolysis oil feed.

8. The method of claim 1, further comprising:

steam cracking a hydrocarbon gas in a hydrocarbon gas steam cracking unit to produce a gas steam cracker effluent;

separating the gas steam cracker effluent in a gas steam cracker effluent separator to produce one or more product streams and the light pyrolysis oil; and passing the light pyrolysis oil from the gas steam cracker effluent separator to the fixed-bed reactor as at least a portion of the pyrolysis oil feed.

9. The method of claim 1, wherein the contacting comprises contacting the pyrolysis oil feed with the hydrogen in the presence of the hydrocracking catalyst in the fixed-bed reactor at a temperature of from 300° C. to 500° C., a pressure of from 1 MPa to 20 MPa, a gas hourly space velocity of from 200 h$^{-1}$ to 1500 h$^{-1}$, and a liquid hourly space velocity of 0.1 h$^{-1}$ to 1.2 h$^{-1}$.

10. The method of claim 1, wherein the diluent further comprises benzene, toluene, xylene, or combinations thereof.

11. A system for upgrading a pyrolysis oil feed, the system comprising:

a pyrolysis oil feed stream comprising:

a heavy pyrolysis oil having greater than or equal to 30 wt. % multi-ring aromatic compounds having boiling point temperatures greater than or equal to 360° C.; and a diluent comprising a light pyrolysis oil having a density less than 0.98 grams per cubic centimeter; and a fixed-bed reactor comprising a hydrocracking catalyst, wherein:

the hydrocracking catalyst comprises:

a mixed metal oxide catalyst comprising a binder and a plurality of mixed metal oxide particles, each of the mixed metal oxide particles comprising iron oxide ($Fe_2O_3$), zirconium oxide ($ZrO_2$), cerium oxide ($CeO_2$), and alumina ($Al_2O_3$); or a supported metal oxide catalyst comprising molybdenum oxide and nickel oxide supported on a catalyst support material comprising a large-pore alumina having a total pore volume of from 0.8 centimeters cubed per gram to 1.1 centimeters cubed per gram; and the fixed-bed reactor is operable to contact the pyrolysis oil feed with hydrogen in the presence of the hydrocracking catalyst to produce a reactor effluent comprising a greater concentration of aromatic compounds having boiling point temperatures of from 50° C. to 360° C. compared to the pyrolysis oil feed; and a hydrocarbon gas steam cracking system upstream of the fixed-fixed bed reactor, the hydrocarbon gas steam cracking system comprising:

a gas steam cracking unit operable to steam crack a hydrocarbon gas to produce a gas steam cracker effluent; and a gas steam cracker effluent separator operable to separate the gas steam cracker effluent to produce one or more steam cracking product streams and a light pyrolysis oil.

12. The system of claim 11, further comprising a naphtha steam cracking system upstream of the fixed-fixed bed reactor, the naphtha steam cracking system comprising:

a naphtha steam cracking unit operable to steam crack a naphtha stream to produce a naphtha steam cracker effluent; and a naphtha steam cracker effluent separator operable to separate the naphtha steam cracker effluent to produce one or more steam cracking product streams and the heavy pyrolysis oil.

13. The system of claim 12, wherein the naphtha steam cracker effluent separator is fluidly coupled to an inlet of the fixed-bed reactor to pass the heavy pyrolysis oil directly to the fixed-bed reactor as at least a portion of the pyrolysis oil feed.

14. The system of claim 11, wherein the gas steam cracker effluent separator is fluidly coupled to an inlet of the fixed-bed reactor to pass the light pyrolysis oil directly to the fixed-bed reactor as at least a portion of the diluent in the pyrolysis oil feed.

15. A method for upgrading pyrolysis oil, the method comprising:

combining a heavy pyrolysis oil and a diluent to produce a pyrolysis oil feed, wherein:

the heavy pyrolysis oil comprises greater than or equal to 30 wt. % multi-ring aromatic compounds having boiling point temperatures greater than or equal to 360° C.; and the diluent comprises a light pyrolysis oil having a density less than 0.98 grams per cubic centimeter;

passing the pyrolysis oil feed to a fixed bed reactor comprising a hydrocracking catalyst comprising pellets having a particle size greater than or equal to 0.1 millimeter, wherein the hydrocracking catalyst comprises:

a mixed metal oxide catalyst comprising a binder and a plurality of mixed metal oxide particles, each of the mixed metal oxide particles comprising iron oxide ($Fe_2O_3$), zirconium oxide ($ZrO_2$), cerium oxide ($CeO_2$), and alumina ($Al_2O_3$); or a supported metal oxide catalyst comprising molybdenum oxide and nickel oxide supported on a catalyst support material comprising a large-pore alumina having a total pore volume of from 0.8 centimeters cubed per gram to 1.1 centimeters cubed per gram;

contacting the pyrolysis oil feed with the hydrogen in the presence of the hydrocracking catalyst at reaction conditions in the fixed bed reactor, wherein the contacting the pyrolysis oil feed with hydrogen in the presence of the hydrocracking catalyst causes at least a portion of the pyrolysis oil to react to form a reaction effluent comprising a concentration of aromatic compounds having boiling point temperatures of from 50° C. to 360° C. greater than the pyrolysis oil feed;

steam cracking a naphtha stream in a steam cracking unit to produce a naphtha steam cracker effluent;

separating the naphtha steam cracker effluent in a naphtha steam cracker effluent separator to produce one or more product streams and the heavy pyrolysis oil; and passing the heavy pyrolysis oil from the naphtha steam cracker effluent separator to the fixed-bed reactor as at least a portion of the pyrolysis oil feed.

16. The method of claim 15, wherein the hydrocracking catalyst comprises the mixed metal oxide catalyst comprising the binder and the plurality of mixed metal oxide particles.

17. The method of claim 15, wherein the mixed metal oxide catalyst comprises from 50 wt. % to 90 wt. % of the mixed metal oxide particles and from 10 wt. % to 50 wt. % of the binder based on the total weight of the mixed metal oxide catalyst.

18. The method of claim 15, wherein each of the mixed metal oxide particles comprise from 60 wt. % to 95 wt. % iron oxide, from 1 wt. % to 20 wt. % zirconium oxide, from 0.1 wt. % to 10 wt. % cerium oxide, and from 1 wt. % to 20 wt. % alumina based on the total weight of the mixed metal oxide particles.

19. The method of claim 15, wherein the mixed metal oxide particles comprise nanoparticles having a particle size of from 20 nanometers to 200 nanometers.

20. The method of claim 15, wherein the pyrolysis oil feed comprises from 75 wt. % to 85 wt. % of the heavy pyrolysis oil and from 15 wt. % to 25 wt. % of the light pyrolysis oil as the diluent, based on the total weight of the pyrolysis oil feed.

* * * * *